(12) United States Patent
Doukai

(10) Patent No.: US 7,590,048 B2
(45) Date of Patent: Sep. 15, 2009

(54) RESTORATION AND PROTECTION METHOD AND AN APPARATUS THEREOF

(75) Inventor: Masami Doukai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 793 days.

(21) Appl. No.: 10/690,228

(22) Filed: Oct. 17, 2003

(65) Prior Publication Data
US 2004/0114595 A1    Jun. 17, 2004

Related U.S. Application Data

(63) Continuation of application No. PCT/JP01/03343, filed on Apr. 19, 2001.

(51) Int. Cl.
*G01R 31/08* (2006.01)
(52) U.S. Cl. .............. 370/217; 370/242; 370/401; 370/410
(58) Field of Classification Search .............. 370/216, 370/217, 221, 242, 351, 437, 465, 401, 140
See application file for complete search history.

(56) References Cited

U.S. PATENT DOCUMENTS 6,336,129 B1 * 1/2002 Ise et al. .............. 709/201
6,530,032 B1 * 3/2003 Shew et al. .............. 714/4
2002/0060985 A1 * 5/2002 Lee et al. .............. 370/216
2002/0181485 A1 * 12/2002 Cao et al. .............. 370/419

FOREIGN PATENT DOCUMENTS

JP    4-65942    3/1992
JP    5-3489    1/1993

OTHER PUBLICATIONS

Watanabe, et al., "Viewing Approaches to a Large Scale Internet Backbone" Technical Report SSE98-52 (Aug. 1998) The Institute of Electronics, Information and Communication Engineers.
U.S. Appl. No. 09/797,419, filed Mar. 1, 2001, Soumiya, et al.

* cited by examiner

*Primary Examiner*—Seema S Rao
*Assistant Examiner*—Mon Cheri S Davenport
(74) *Attorney, Agent, or Firm*—Katten Muchin Rosenman LLP

(57) ABSTRACT

A label switching router (LSR) is disclosed in which a control label switched path (LSP) is set up on a route of LSRs, in the reverse direction of traffic, for restoration and protection. Link failure, node failure, etc., are signaled on the control LSP. Further, a process is carried out in units of LSPs (Bypass Tunnels), each of which bundles LSPs having the same switching point destination of traffic. A label is assigned to every Bypass Tunnel.

21 Claims, 29 Drawing Sheets

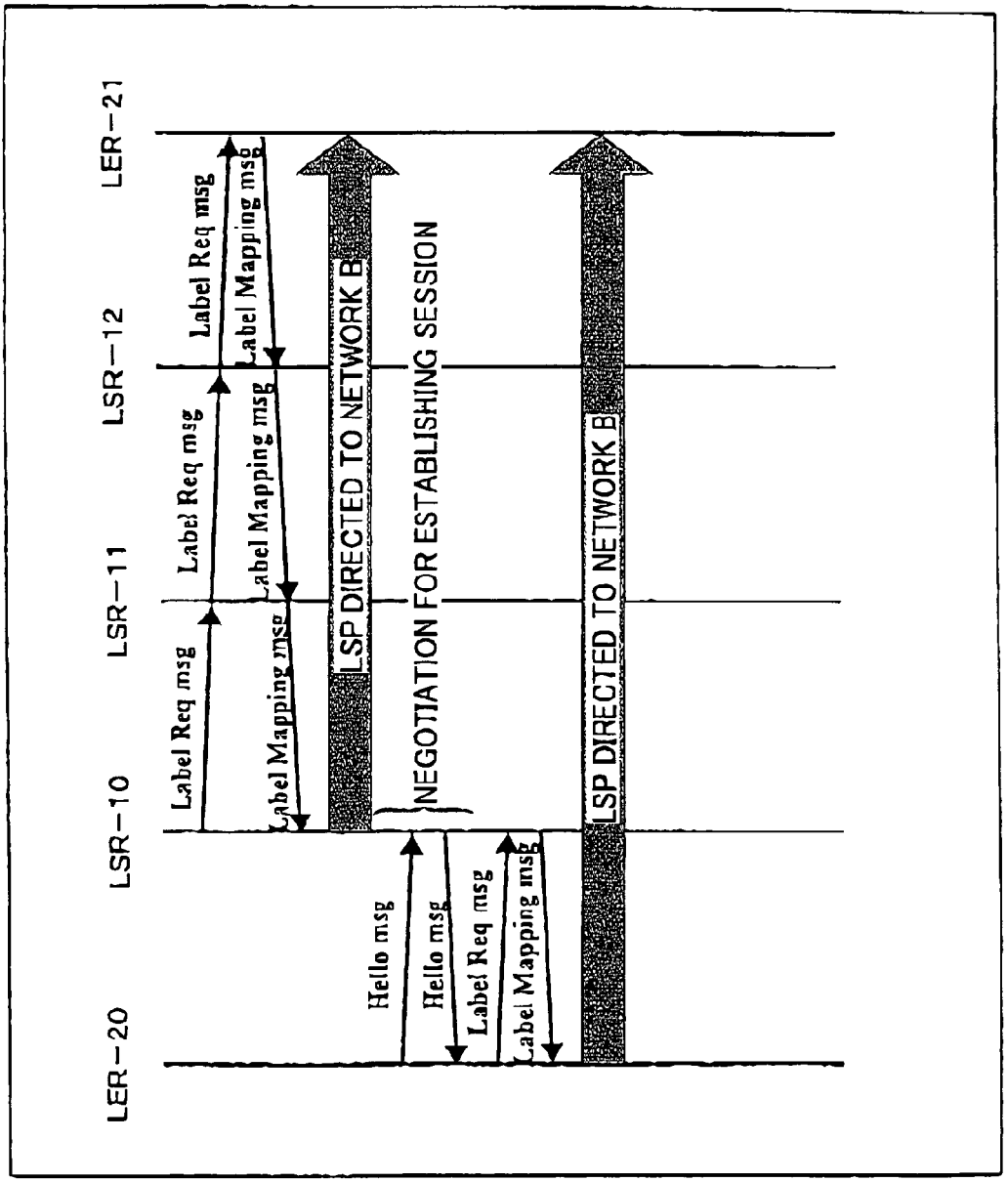

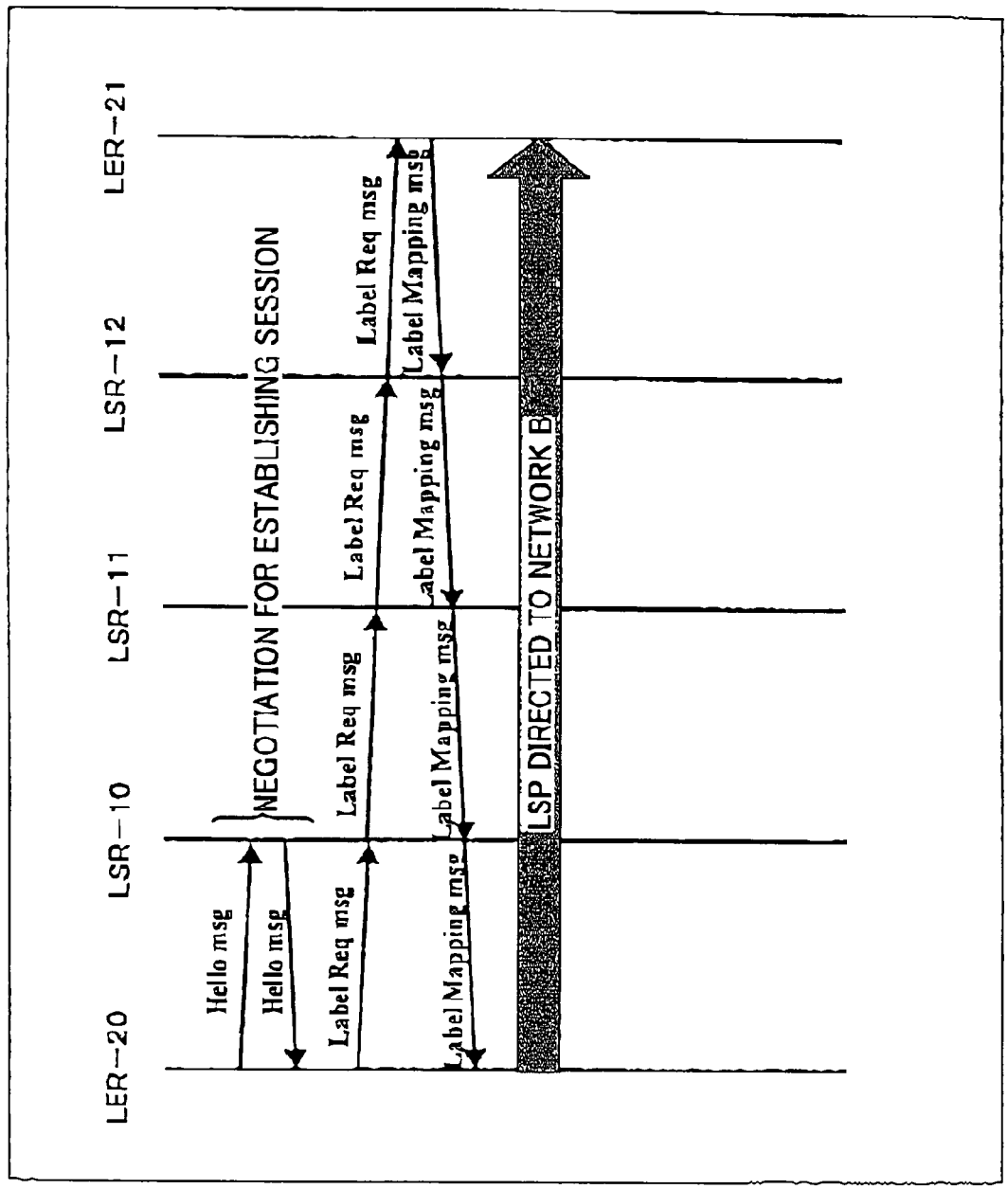

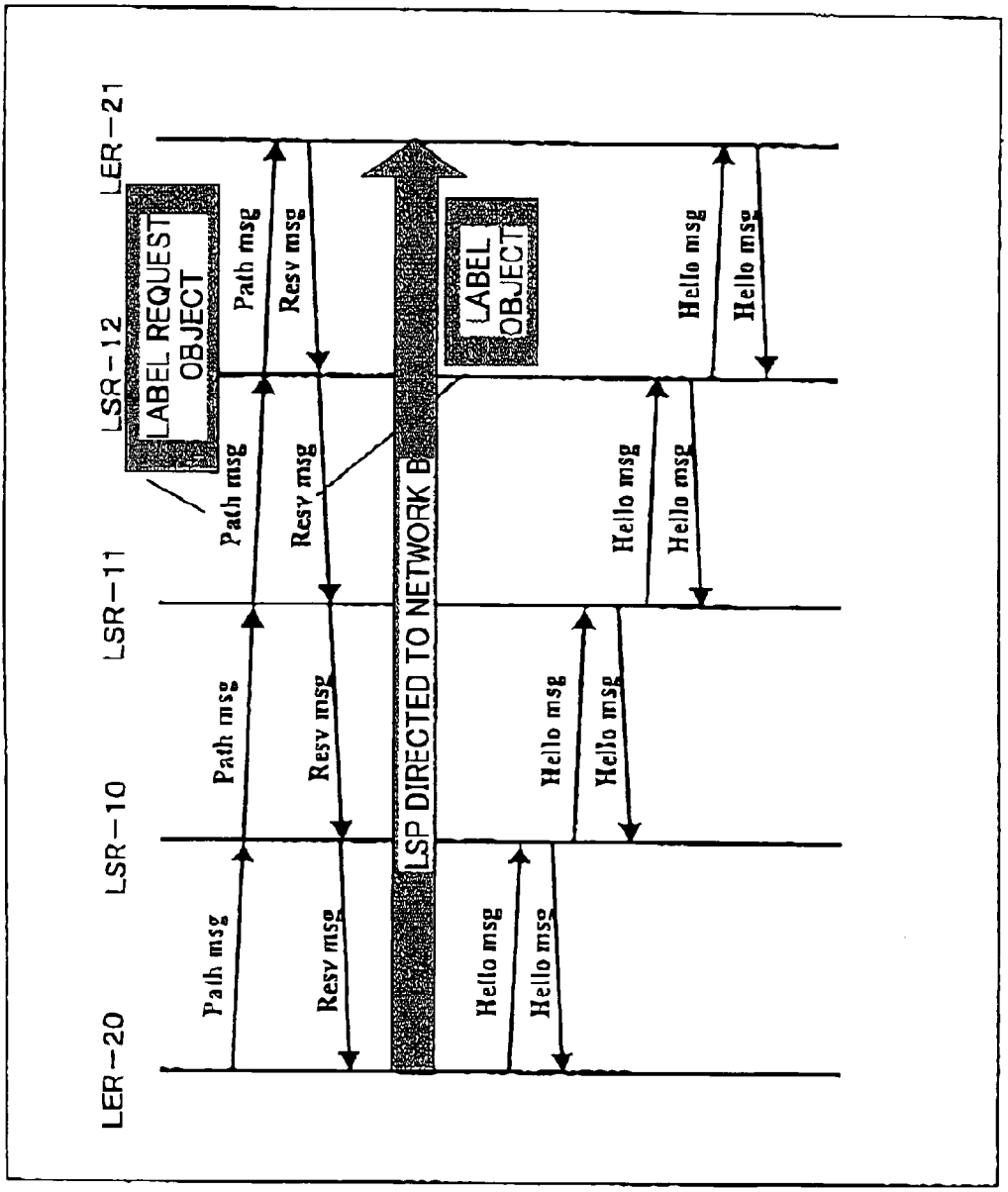

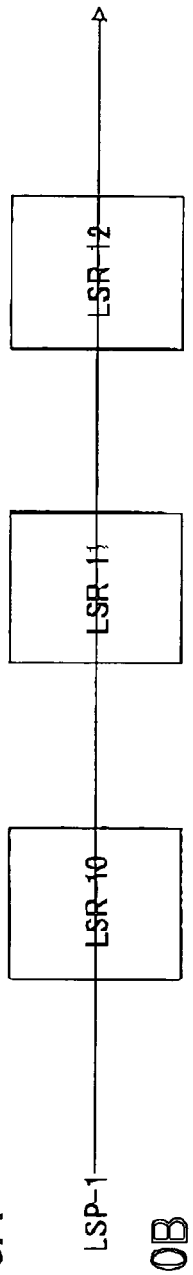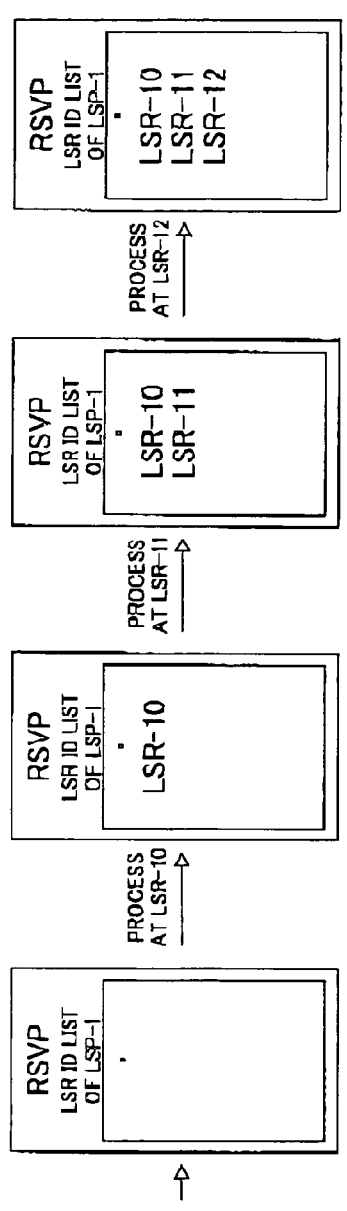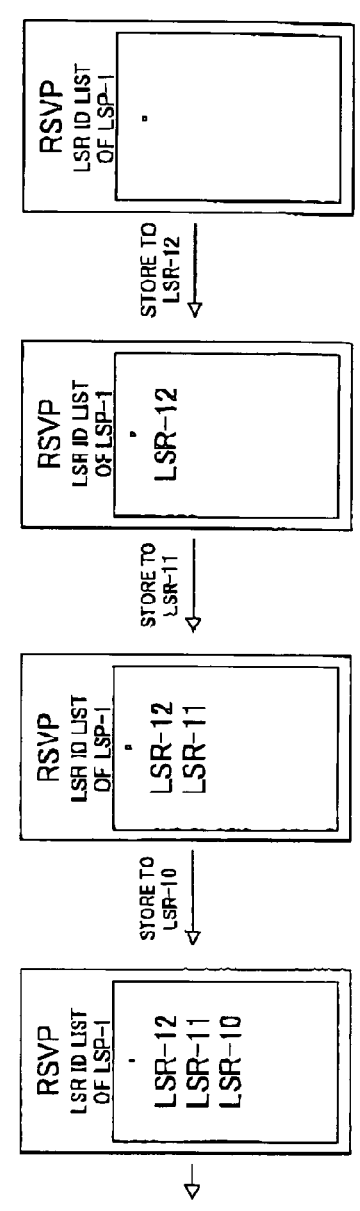

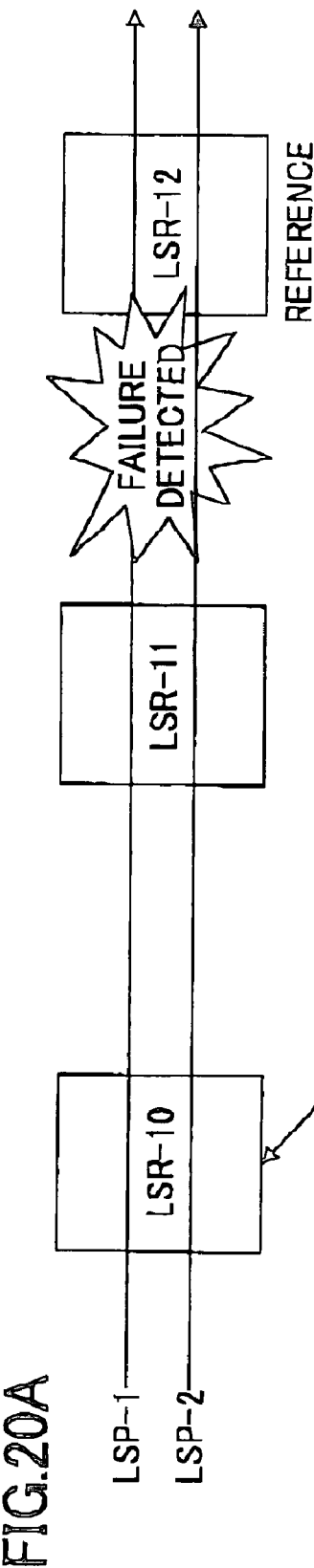
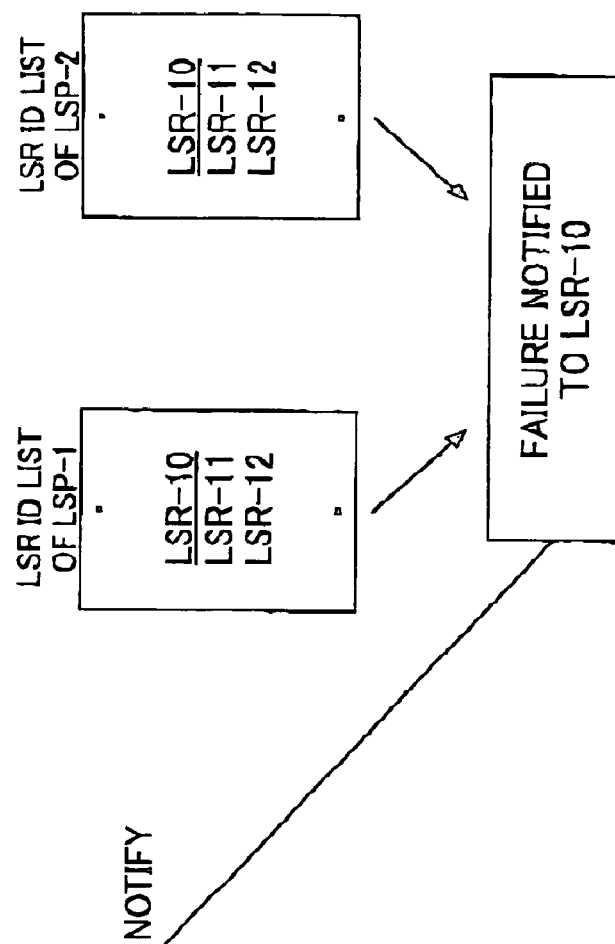
FIG.20A
FIG.20B
FIG.20C

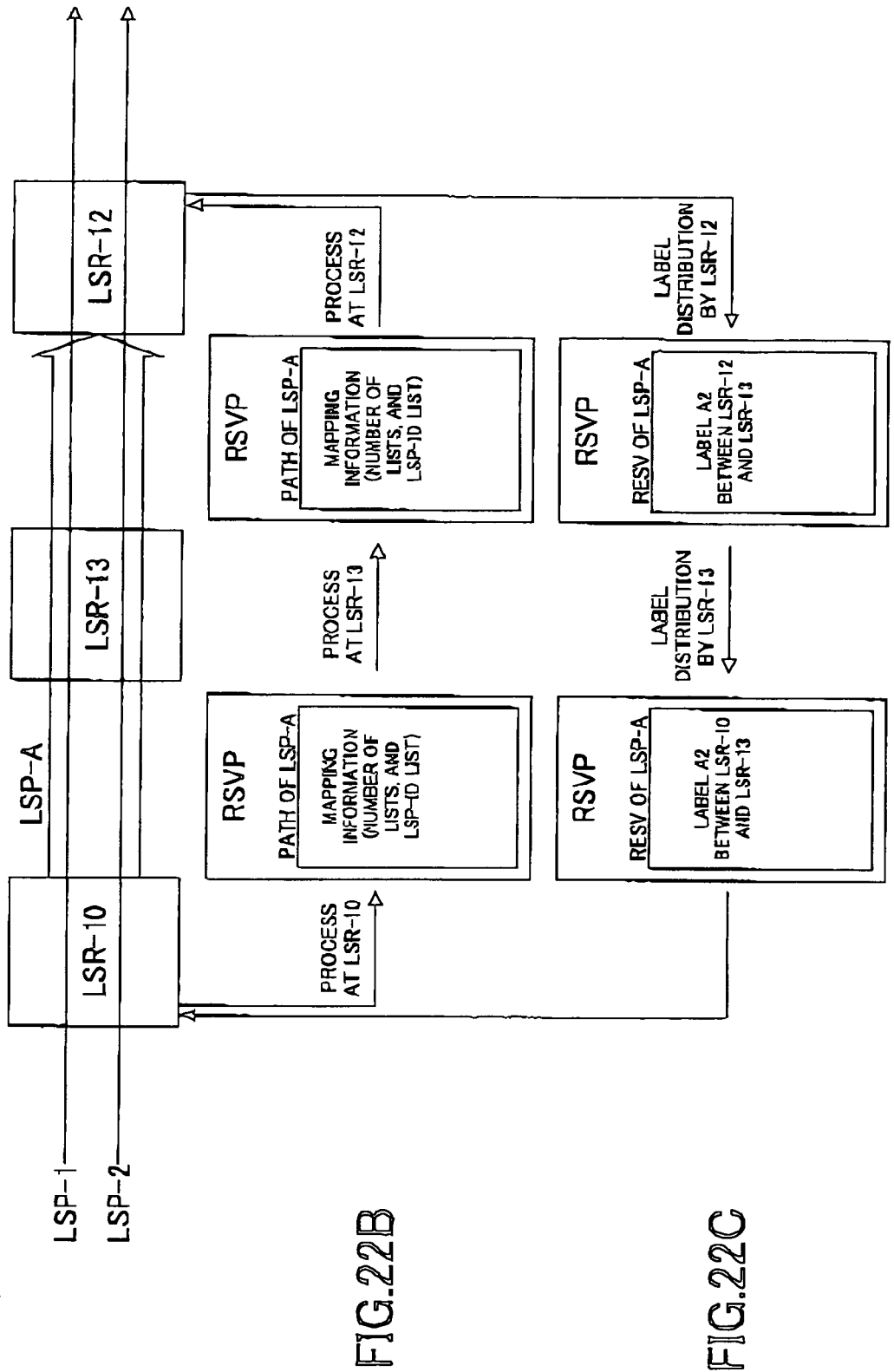

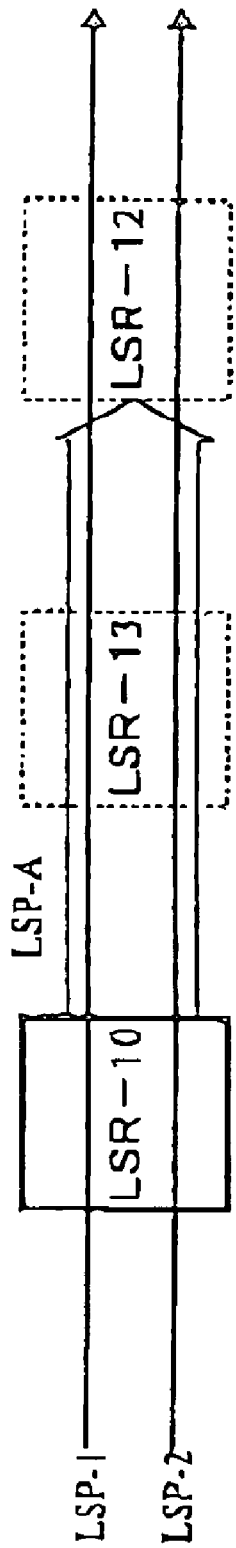

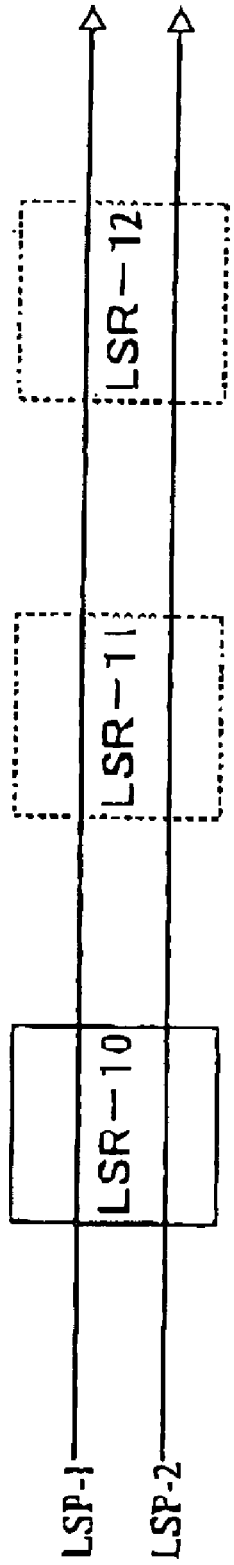

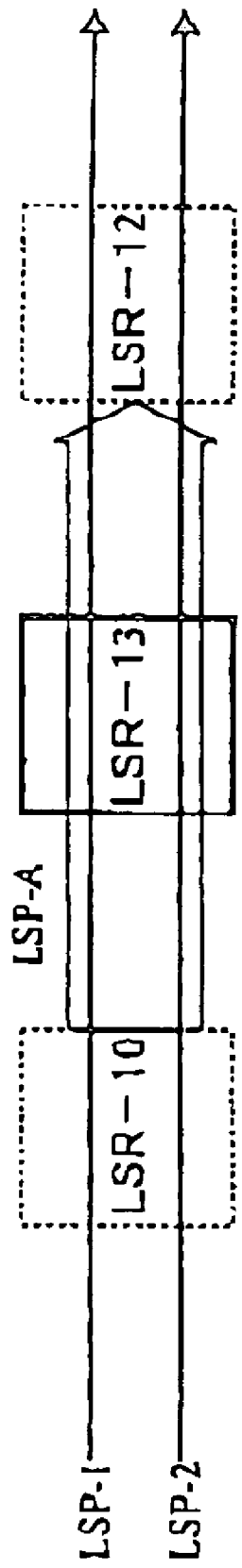

RESTORATION AND PROTECTION METHOD AND AN APPARATUS THEREOF

CROSS-REFERENCE TO RELATED APPLICATION

The present application is a continuation of International Application No. PCT/JP01/03343 which was filed on Apr. 19, 2001.

TECHNICAL FIELD

The present invention relates to a restoration and protection method of an IP (Internet Protocol) network when link failure and node failure occur, and traffic is interrupted and communications quality is degraded in an MPLS (Multiprotocol Label Switching) network; and a label switching router that realizes the method.

BACKGROUND TECHNOLOGY

As a technology for forwarding traffic in an IP network of the OSI layer 3 at high speed, MPLS has been developed by the IETF (Internet Engineering Task Force).

Here, an outline of MPLS is provided

An MPLS network is structured as shown in FIG. 1. The MPLS network 1 includes label edge routers (called LERs in the following) LER-20 through LER-23, and label switching routers (called LSRs in the following) LSR-10 through LSR-13. This network is called an MPLS domain.

Here, LERs 20 through 23 are routers that realize a network layer service of high performance and high added value by adding and deleting a label to and from a packet, the LERs being located at boundaries with existing IP networks 2 through 5.

Further, LSRs 10 through 13 are routers that carry out label switching of a packet or a frame to which a label is added LSRs 10 through 13 can be structured such that not only label switching but also layer 3 routing and layer 2 switching may be supported.

Further, there is a label distribution protocol (LDP) as one of the protocols used when label information is exchanged between devices on the Internet by label switching, cooperating with a routing protocol of a standard network layer.

In FIG. 2, label switched paths (LSP) are established; a first label switched path (LSP-1) being established through LER-20, LSR-10, LSP-11, LSR-12, and LER-21, and a second LSP (LSP-2) being established through LER-22, LSR-10, LSR-11, LSR-12, and LER-23 in the MPLS network 1 as shown in FIG. 1.

In LSP-1, LER-20 adds a label to an IP packet frame that arrives at the MPLS domain from the IP network 2, and transmits the packet frame to LSR-10. The IP packet frame, to which the label is added, is transmitted to LER-21 through LSR-11 and LSR-12. By LER-21, the label is deleted and the packet frame is transmitted to the IP network 5 as an ordinary IP packet frame.

Similarly, in LSP-2, LER-22 adds a label to an IP packet frame that arrives at the MPLS domain from the IP network 3, and transmits the packet frame to LSR-10. The IP packet frame, to which the label is added, is transmitted to LER-23 through LSR-11 and LSR-12. By LER-23, the label is deleted and the packet frame is transmitted to the IP network 5. In addition, in LSR-10, LSR-11, and LSR-12, when the packet frame is transmitted, swapping of labels is performed.

Adding, swapping, and deletion of labels are explained using FIG. 3. From the IP networks 2 and 3, LERs 20 and 22, respectively, each adds, for example, a label A (refer to frame 32 in FIG. 3) to an IP packet frame 31, and transmits the IP packet frame to LSR-10. LSR-10 receives a frame 32, carries out swapping of the label A to a label B (refer to frame 33 in FIG. 3), and transmits the IP packet frame to LSR-11. Similarly, LSR-11 and LSR-12 carry out swapping of the label to C and D, respectively. In LER 21 and 23, the label is deleted (refer to frame 36 in FIG. 3), and the packet frame is transmitted to the IP networks 4 and 5, respectively, as an ordinary IP packet frame.

Next, the label used by MPLS is explained. First, in order to realize MPLS, there are two methods, namely (1) a method using an existing label (refer to the LAN and PPP in FIG. 4), and (2) a method defining a new label (refer to the SHIM header in FIG. 4).

(1) The method using the existing label can be carried out as follows.

(a) VPI (Virtual Path Identifier) and VCI (Virtual Channel Identifier) of ATM (Asynchronous Transfer Mode) are used as the label.

(b) DLCI (Data Link Connection Identifier) of Frame Relay is used as the label.

(c) A time slot of SONET (Synchronous Optical Network)/SDH (Synchronous Digital Hierarchy) is used as the label.

(d) A wavelength in optical devices, such as DWDM (Dense Wavelength Division Multiplexing), is used as the label.

(e) A physical interface identifier of a device that replaces a physical interface is used as the label.

(2) The method defining the new label uses a label newly defined, and is called a SHIM header. The SHIM header is inserted between the layer 3 and the layer 2. As shown in FIG. 5, the SHIM header consists of 4 octets, including an 8-bit TTL (Time To Live), and a one-bit pointer s for label stacks, in addition to a 20-bit label. Here, TTL signifies a period during which the label is to be alive (to exist), defined by the number of routers through which the packet frame travels.

Further, the following becomes possible by using MPLS on the IP network.

(1) Controlling adding, deleting, switching, and the like is realized from the IP layer that is the layer 3 by treating the SHIM header, VPI/VCI of ATM, DLCI of Frame Relay, the time slot of SONET/SDH, the optical wavelength, the physical interface, and the like as the label in layer 2 and layer 1.

(2) At an ingress node (an entrance node, such as LERs 20 and 22 in FIG. 2) of the network that can carry out MPLS, a label is given to an IP packet of traffic obtained as a result of an IP address search (IP forwarding process) that takes the subnet mask into consideration. Since no nodes on the forwarding route have to perform an IP forwarding process like the conventional IP network, because the packet is forwarded by relay nodes using the label, the time needed for forwarding the IP packet by each node is shortened.

(3) usually, in an IP network, a route is selected based on a cost index called "metric" that corresponds to the number of routers to a destination IP address, or the physical bandwidth to a network address, such that the metric becomes small. However, since the metric does not consider actual traffic load based on physical topology, traffic may become concentrated on a specific link where the metric is small. In an MPLS network, compulsory routing (Constraint Based Routing) can be provided using the label so that the traffic load is distributed based on prediction, and the network is efficiently used.

(4) Only the ingress node and an egress node (an exit node) in the MPLS network have to be provided with of a private IP address in a VPN (Virtual Private Network), the private IP address possibly being duplicated, because forwarding by the relay node(s) uses the label without using the IP address. In this manner, scalability as a core network for a VPN service becomes high.

(5) By assigning resources that suffice for QoS (Quality of Service) and CoS (Class of Service), such as bandwidth and transmission delay, at each node in the MPLS network at the time of generating the label, a logical link (path) that is a physical link with the label attached is established, and quality higher than that of a network based only on IP is attained.

(6) The MPLS network provides a traffic recovery mechanism when link failure, node failure, etc., occur. By preparing a recovery path of MPLS, serving as a protection path, restoration that is quicker than re-routing of an IP network is realized.

(7) In the MPLS network, hierarchy of traffic is attained by adding a new label in the MPLS domain of a different labeling technique by stacking the labels.

The above-mentioned recovery is a network function for automatically restoring traffic that meets with link failure, node failure, quality degradation, etc., and is classified as follows in the present specification.

(1) A mechanism that carries out restoring by recalculation of routing is called re-routing.

(2) A mechanism that carries out restoring by setting up an alternative path after failure is called restoration.

(3) A mechanism that carries out restoring by setting up an alternative path (protection path) almost simultaneously with setting up a working path is called protection.

Time required until traffic is restored is the longest with rerouting, the next longest with restoration, and the shortest with protection. In the following, three conventional recovery mechanisms are explained, namely, the case of a network being structured only by IP, the case of an MPLS network that is topology-driven, and the case of an MPLS network where compulsory routing direction (Constraint Based Routing) is used.

Before going into details, protocols used by existing IP networks and MPLS networks are explained one by one:

OSPF
LDP
CR-LDP (Constraint based Routing LDP)
RSVP-TE (Extension to Resource reservation Protocol for LSP Tunnel)
Loop prevention (Loop Prevention)
(1-1) OSPF As existing routing protocols, the following are supposed, which are generally classified into internal routing protocols and external routing protocols.

An interior gateway protocol (IGP) of OSPF operates within a certain independent management body (AS: Autonomous System), and includes OSPF, Integrated IS-IS (Intermediate Systems-to-Intermediate Systems for Internet protocol), etc.

Further, an external gateway protocol (EGP) operates between certain independent management bodies (Autonomic Systems), and includes BGP-4 (Border Gateway Protocol Version 4), etc.

OSPF is used as an IGP routing protocol. Further, in OSPF, the AS shares a database that describes the topology of the AS, and calculation of Dijkstra's algorithm is performed using the routing information and the shortest path tree from the database. The index when generating the shortest path tree is the metric. BGP-4 that treats the metric as the number of routers to a destination IP address is categorized as a distance vector type; and OSPF and IS-IS that treat the metric as cost corresponding to the physical bandwidth to a network address are categorized as link state types.

Operations of OSPF are shown in FIG. 6, wherein the case of LER-20 being newly added to the MPLS network 1 as shown in FIGS. 1 and 2 is illustrated FIG. 6 shows steps of negotiation for establishing a session, synchronization of database information, and routing for information flooding.

When the router LER-20 is newly added to the network that already includes the routers LSR-10, LSR-11, LSR-12, and LER-21, first, OSPF determines operating parameters, such as a version code and capability of other OSPF protocols, exchanges routing information mutually using a Hello message, and establishes a neighboring relation (negotiation for establishing the session).

An information exchange between LER-20 and LSR-10 starts only after establishing the neighboring relation. The information serves as a source of routing information, and a topology database of each router is exchanged using a DD (Database Description) Exchange message, the topology information including topology information of a network that LER-20 connects as its subordinate, and topology information of networks, other than LER-20, which LSR-10 already stores (synchronization of database information).

LSR-10 transmits the topology information that LER-20 newly provides as Link State Advertisement (notice of a link state) to routers, with which neighboring relations are already established before LER-20 joins (flooding of routing information). In FIG. 6, the transmission is carried out from LSR-10 to LSR-11, LSR-12, and LER-21. The Link State Advertisement is carried out by using a message of Link State Request/Acknowledgment/Update.

With the topology information being provided down to LER-21, and each router updating the routing information, communications between LER-20 and LER-21 become available.

The routing information includes a network address, a subnet mask, a next-hop address, an interface that the next-hop address connects to, and the metric. The network address occupies 4 bytes in the case of IPv4, 16 bytes in the case of IPv6, and an effective value is obtained by carrying out an AND calculation of an IP address that identifies the network and the subnet mask. The subnet mask occupies 4 bytes in the case of IPv4, and 16 bytes in the case of IPv6, corresponding to the network address, and "1"s are filled up to an effective high bit position. The next-hop address specifies to which adjoining router the traffic that is destined for the network specified by the network address and the subnet mask should be transmitted. The interface that the next-hop address is connected to is an interface to which the neighboring router is connected. As for the metric, the metric having the smallest value is selected, when there are multiple metrics available for the same network address and the same subnet mask. Routing information can also be generated by routing protocols other than OSFP, and where two or more routing protocols are operating, a common database may be established.

(1-2) LDP

The label in an MPLS network may be assigned corresponding to the network topology of the routing information. In this case, LDP is used as a protocol for distributing label binding.

Operations of LDP are shown in FIG. 7. Prior to using the functions of LDP, a communication state (session) between neighboring LSRs is established, wherein a label request and distribution process can be performed as shown in FIG. 7. When the router LER-20 is newly added to the network that already includes the routers LSR-10, LSR-11, LSR-12, and LER-21, communications on TCP (Transmission Control Protocol) are enabled, then LDP determines operational parameters (negotiation), such as version information and capability of other LDPs, using a Hello message; label information is mutually exchanged; and neighboring relations are established.

Next, when newly generating label information, LDP transmits a Label Request message to LSR-10 in the downstream for acquiring a label according to an updated (added) entry of the information about the forwarding information base (FIB: Forwarding Information Base) prepared in the router, the updated (added) entry being related to the change of the topology of the network. The message contains an information element specified by TLV (Type-Length-Value). Here, the FIB is simplified routing information.

In the present invention described below, FEC TLV (Forwarding Equivalence Class Type-Length-Value) is used. The FEC TLV contains information about the traffic to be carried by the label that is requested, the information containing, for example, the network address and the subnet mask.

Optionally, Path Vector TLV designed for loop prevention mentioned below is used. A list of LSRs on the path generated by the Path Vector TLV message is used, rather than for loop prevention.

There are two modes as regards processing of the Label Request message. One is Independent Label Distribution control, wherein label distribution is carried out independently only between two routers, and the other is Ordered Label Distribution control, wherein a request is passed to the furthest router (LER) that can process the request using the label, and label distribution is further carried out in sequence from there.

In FIG. 7, label distribution is performed by the Independent Label Distribution control between LER-20 and LSR-10.

A process for attaching a label to traffic, for which the label is requested by the Label Request message, is performed by using a Label Mapping message. The Label Mapping message is transmitted as a response to the Label Request message transmitted by the LSR, and the label is distributed to the routers one by one.

In the present invention, TLV shows a label value assigned to the request.

As an option, Label Request Message ID TLV that shows a request, and Path vector TLV can be used. Forwarding using the label becomes possible by distributing the label to the LSR that transmits the request by a Label Mapping message.

(1-3) CR-LDP

CR-LDP, which is an extension of LDP, is used as a signaling protocol for realizing Constraint based routing. Operations of CR-LDP are shown in FIG. 8.

CR-LDP, which is expanded by increasing the capacity of TLV of the LDP message, performs label distribution processing by Ordered Label Distribution control.

The TLV that is added by the Label Request message, and used by the present invention includes the following.

LSP-ID TLV (Label Switched Path IDentifier Type-Length-Value) is indispensable, and is used for identifying the LSP.

ER TLV (Explicit Route Type-Length-Value) is an option, wherein a list of LSRs is included, the list being set up by the LSP.

Traffic TLV is an option, and describes characteristics of the traffic passed through a LSP. TLV added by the Label Mapping message includes LSP-ID TLV and Traffic TLV, which are options.

(1-4) RSVP-TE

RSVP-TE that is an extension of RSVP is used as a signaling protocol for realizing Constraint based routing as a LSP Tunnel.

Operations of RSVP-TE are shown in FIG. 9. In RSVP, an item equivalent to TLV of LDP is expressed by an object.

(1-5) Loop prevention

RSVP-TE and LDP include a function for determining whether the LSP is looped during setting up the LSP and communicating after setting up. This function is realized by a RECORD_ROUTE object in the RSVP-TE, and by a Path Vector TLV in the LDP.

As shown in FIG. 10, the object or TLV is put in by the PATH message of RSVP-TE or the Label Request message of LDP, respectively, which is a label request. An LSR that processes the message first determines whether the Destination IP address of the LSR is included in the LSR-ID (IP address of LSR) list contained in the object or TLV. If the Destination IP address of the LSR is not included, the Destination IP address of the LSR is added to the LSR-ID list, and the LSR transmits the object or TLV to the next LSR. If the Destination IP address of the LSR is included, since the process is already carried out by the LSR, traffic is looped, and travels around the network. In this case, the label request processing is suspended, and the label request is returned to the transmitting party with an error message.

If the traffic reaches the Egress Node that is the exit node of the LSP, the LSR-ID list is completed sequentially from the Ingress Node that is the entrance node of the LSP. Next, if there is no loop, the RESV message of RSVP-TE or the Label Mapping message of LDP for label distribution adds the LSR-ID, and is passed to the upstream LSR, like the case of the object or the label request of TLV. If the traffic reaches the Ingress Node of the LSP, the LSR-ID list is completed sequentially from the Egress Node of LSP.

A relay node cannot acquire the LSR-ID list of all the LSPs in one operation; however, the relay node acquires the LSR-ID list of all the LSPs by merging the LSR-ID list from the Egress Node and the LSR-ID list from the Ingress Node.

Next, an explanation is presented as to when node failure and link failure occur in a network in the cases as follows:
   in the case of a network being structured only by IP
   in the case of an MPLS network that is topology driven
   in the case of an MPLS network where compulsory route specification is used (2-1) In the case of the network being structured only by IP Here, the case where OSPF, which is explained above, in used as a routing protocol is explained. In an IP network, when a router A is newly added to the network, in order to start communications by the existing routing protocol, an operation parameter is determined, and neighboring relations are established.

Then the topology database that each router stores is exchanged, and routing information is generated from the database. Furthermore, the FIB used for actual IP forwarding is built from the routing information as cache data. The main information elements of the FIB are a network address, a subnet mask of the network address, and an output interface. Exchange of the routing information by the routing protocol is performed by the routing protocol being injected into the router linked to the network, being spread from router to router that have neighboring relations one by one, and the whole IP network being notified. The manner in which the information is spread is called flooding. The routing information being flooded to the whole IP network, and reflected in the FIB of each router, enables all the nodes of the IP network to transmit traffic to the network A that is newly connected.

Since memory is needed in large quantities if all routers are to share all the information on the topology of the network, a specific router group is divided into areas, the topology information of the area is shared, and the information outside the area is summarized at an intermediate router. In this manner, topology information is made concise. Further, topology information about a network described by a private IP address is not generally flooded to outside of the area.

Next, forwarding in IP is explained. When an IP packet is received, a router searches the FIB set up by the routing protocol by using the Destination IP address described in the IP packet as a key, and transmits the packet to the output interface described in the FIB. For searching, a logical AND of the Destination IP address and the subnet mask is obtained, and it is determined whether the result and network address match. If there are multiple matches, a match where the subnet mask is the longest is selected (this is called searching for the longest match). An example, wherein an IPv4 entry having an output interface 1, a network address of 133.161.44.0, and a subnet mask of 255.255.255.0 in FIB, is searched by an address Destination IP address (key) of 133.161.44.65, is described. In this case, AND of the key 133.161.44.65 and the subnet mask 255.255.255.0 is obtained, the result of which is 133.161.44.0. If this value is in agreement with the network address of the entry, the entry is considered serving as one of candidates. Where another FIB entry having an output interface 2, a network address of 133.161.44.64, and a subnet mask of 255.255.255.192 also serves as a candidate, this entry is selected, and the IP packet is transmitted from the output interface 2, because this entry has the greater subnet mask.

Each router individually performs the operation as above, and the IP packet is delivered to a terminal having the destination IP address. In this manner, communications are possible without establishing a connection in advance. For this reason, an IP network is called a connectionless type. The case where link failure occurs in this IP network is described using FIG. 11.

Link failure is first detected by a failure detection mechanism of the link layer 2 or below. Where transmission and reception are carried by the same physical circuit (fiber), the link failure is detected by the router on both ends. However, in the case that transmission and reception are carried by different circuits (fibers), the link failure is detected only by the receiving router (LSR-12 in FIG. 11). In the latter case, a transmitting router is notified by a receiving router, like RDI in the case of ATM (Remote Defect Indicator). In the case of FIG. 11, an LS Ack message is transmitted from LSR-12 to LSR-13. In this manner, the link failure is signaled to the transmitting router. Such detection is generally performed in several milliseconds. Further, although failure detection of a link is possible by response timeout of a survival checking mechanism (a Hello message, response check of TCP, etc.) by the routing protocol itself, detection time is generally dozens of seconds, and 90 seconds by the default of OSPF.

The router that detects a link failure sets the maximum value to the metric of the failed link so that the failed link is not used. In this manner, the routing information on the router is updated, and an entry having a smaller value of the metric is set at the FIB for the same network address and the same subnet mask.

Since traffic is forwarded in reference to the entry of the FIB that is updated, IP packets are transmitted from another output interface.

Further, the information that contains the updated metric is simultaneously flooded to a neighboring router, and by updating the routing information and FIB of the neighboring router, routing specification for the traffic is updated such that the neighboring router transmits the traffic to another link.

The routing information is spread from router to router one by one (flooding), and the whole IP network is notified of the update. When the failed link is restored, the routing information is further updated, and communications on the link can be carried out again. According to the recovery mechanism by rerouting, as described above, the routing information on the concerned routers needs to be updated until recovery from the failure is completed, which takes from dozens of seconds to several minutes.

When node failure occurs, as shown in FIG. 12, the same thing is accomplished only by changing a router for failure detection from the router on the reception side of the link (LSR-12) to routers (LSR-10 and LSR-13) that are adjacent to the router that detects the failure.

Thus, the network of only IP employs the recovery mechanism of rerouting that uses updating of the routing information by the routing protocol as the base, and it takes from dozens of seconds to several minutes.

(2-2) In the Case of the MPLS topology-driven network

Generally, the topology-driven MPLS network operates based on change of the routing information on an IP network (network topology). LDP carries out exchange of a label in this MPLS network. First, LDP establishes a session (state that can communicate) between neighboring LSRs. In advance of the negotiation of an actual label, routing information currently existing in the IP network is exchanged, and the FIB is built.

Next, a label is requested using LDP based on the topology that is set up in the FIB, as soon as the FIB is updated. According to the label request, a label is provided from the downstream side of traffic. This label is provided to the traffic in one direction that goes to an addressed network, and is not bi-directional. Each LSR generates label information (LIB) based on the label.

When the request and distribution of the label are completed in the MPLS network, a LSP in compliance with the label is built between LERs that are located at the boundaries of the MPLS network and the networks of only IP that cannot perform MPLS A packet is forwarded in the MPLS network as follows. The entrance node attaches a label (Label Push) to an IP packet with reference to a destination IP address. Forwarding is carried out with reference to the LIB. A relay node replaces the label, being called label swap, of an MPLS frame with reference to the LIB, and forwarding is carried out. The exit node removes (Label Pop) the label of the MPLS frame, and the MPLS frame is transmitted to an output interface. The case where link failure occurs in the topology-driven MPLS network is shown in FIG. 12.

Since the LSP is set up in only one direction in MPLS, there is no way of reporting a failure at present, even if the failure is detected. Therefore, help from the IP network is needed. After processing the recovery mechanism (rerouting) of the IP network, the LSP is restructured according to the updated topology.

In the case of node failure taking place, although a different LSR detects the failure, the same process as above is performed as shown in FIG. 13.

As described above, the topology-driven MPLS network is based on the topology of the IP network. Accordingly, the recovery mechanism is like the case of the network of only IP. Namely, at first, rerouting by updating the routing information by the routing protocol is performed, and then, the LSP is restructured. For this reason, the time required to restore the traffic ranges from dozens of seconds to several minutes, like the IP network.

(2-3) In the Case of the MPLS Network Using Compulsory Route Specification

In the MPLS network where the compulsory route specification is used, setting up is carried out on the LSP when the following occurs, namely The link along which the traffic is to pass is specified.

The link along which the traffic is to pass is limited by specifying parameters, such as bandwidth and transmission delay.

The LER at the entrance of the MPLS network, to which the conditions are specified, searches for a route that should be set up as the LSP, using the conditions, routing information, and information flooded by extending the routing protocol and the FIB. According to the result of the search, route specification is carried out by specifying either all the LSRs on the LSP, or a part of the LSRs.

The negotiation according to the information of route specification is carried out using RSVP-TE or CR-LDP. A request of CR-LSP that requests compulsory route specification for the LSP is processed one by one according to the path of LSRs specified in the CR-LSP message. The request is returned with a label of the LER that is connected to the addressed network or the nearest MPLS network, and a one-way LSP that goes to the addressed network is set up. The case where link failure occurs in the MPLS network with the compulsory route specification is shown in FIG. 15. In FIG. 15, a recovery path is set up in advance between LSR-10, LSR-13, and LSR-12.

Here, for the MPLS domain, since the LSP is set up in only one direction, even if link failure occurs, there is no way to signal the failure after detecting the failure in the MPLS domain at present.

For this reason, the IP network needs to help such that information about the failure is given to an upstream LSR from the failed link where traffic originally flowed. When the information reaches the PSL (path switching LSR), and is processed by the PSL that sets up the recovery path for maintenance, the traffic is switched to a recovery path side, although an actual setup by RSVP-TE or CR-LDP is needed in the case of restoration.

There are two repairing methods according to size of the recovery path to be set up. Namely, global repair sets up the recovery path between the Ingress Node of traffic and the Egress Node, and local repair sets up the recovery path between relay nodes, the number of which is made the smallest possible. Generally, global repair takes a longer time than local repair, because there is time delay in transmitting the information to the PSL.

Further, by setting up a recovery path before failure takes place, information of an LSR that is on the route of the recovery path is extracted beforehand; and by setting up the LSR after failure taking place, restoration can be used as the recovery mechanism. According to the local repair method, switching can be performed within several seconds by setting up a recovery path as protection.

In the case of node failure, as shown in FIG. 13, although the LSR that carries out failure detection is different, the same process is performed.

Therefore, in the MPLS network where compulsory route specification is used, restoration and protection can be performed by setting up a recovery path for maintenance in addition to re-routing of the IP network. The time to restore the traffic is less than several seconds.

According to conventional MPLS restoration, set up of every LSP has to be updated as shown in FIG. 15. When switching paths from the paths indicated by solid lines to the paths indicated by dotted lines, it is necessary to newly set up LSP-1' through LSP-5' for LSP-1 through LSP-5, respectively.

FIG. 16 shows a conventional data format before and after MPLS restoration.

An example of the data format is shown about the case where LSP-1 and LSP-2 are established by LSR-10, LSR-11, and LSR-12 before MPLS restoration; and LSP-1' and LSP-2' are established by LSR-10, LSR-13, and LSR-12 after MPLS restoration.

Before the restoration of LSP-1, LSR-10 changes the label from label-a1 to label-a2, LSR-11 changes the label from label-a2 to label-a3, and LSR-12 changes the label from label-a3 to label-a4. After restoration of LSP-1, LSR-10 changes the label from label-a1 to label-a2', LSR-13 changes the label from label-a2' to label-a3', LSR-12 changes the label from label-a3' to label-a4.

Further, the same processing is performed also in LSP-2.

By the way, a conventional MPLS network has the following problems, such as considerable time being taken before a new recovery path is actually set up for traffic to flow, even if the recovery path is set up in advance, as shown in FIG. 17 and FIG. 18.

(Problem 1) Since the flooding technique of a routing protocol is used by a router (including an LSR) detecting link failure and node failure for transmitting information to another router that serves as a switching point of traffic, processing is required for every router, and it takes dozens of seconds or longer, and restoration of traffic is delayed.

(Problem 2) when there is link failure or node failure, even if the router (including an LSR) serving as the switching point of traffic updates the FIB by rerouting, and transmits the traffic to another output interface, flooding of the updated routing information may not have been spread to all the router groups as the router expects, an intermediate router may forward the traffic in an unexpected direction, and the traffic may be lost.

(Problem 3) When there is link failure or node failure, since an LSR (PSL) serving as the switching point of traffic carries out the switching in units of LSPs described by the LIB in the LSR, processing time is taken in proportion to the number of LSPs, and restoration of the traffic is delayed.

(Problem 4) When there is link failure or node failure, since the switching of the traffic is carried out with individual LSPs, a label for a recovery path is needed for every LSP, a large amount of the label resources is consumed, and there is a possibility of shortage of label resources occurring in a desired link.

(Problem 5) Means for setting up a recovery path is based on a maintenance person, and operations management is complicated.

BRIEF SUMMARY OF THE PRESENT INVENTION

The general object of the present invention is to offer an improved restoration and protection method, and a label switching router that solves the problems of the conventional technology mentioned above.

Another object of the present invention is to offer a restoration and protection method and a label switching router that can perform restoration and protection at high speed when link failure or node failure occurs, causing traffic disconnection or a quality reduction to occur in an MPLS network.

In order to solve these problems, a control LSP is set up on the route of LSRs serving as a recovery path, in a direction that is opposite to the traffic flow, through which control LSP, link failure, node failure, etc., are signaled; and a unit of LSPs (Bypass Tunnels), which are bundled for every destination, is treated as the processing unit of a PSL that serves as a switching point of the traffic, and, for example, a label is given to every Bypass Tunnel.

In order to attain the objects, from the viewpoint of a router to which a notice of failure is to be sent, the label switching router of the present invention, which realizes MPLS on an IP network, is structured such that the notice of failure is transmitted to another label switching router having an IP address upstream in the LSP by two or more stages, when a signal from a reception link in the LSP is no longer detected.

In this manner, the notice of the link failure or node failure, which is conventionally provided by the flooding of a routing protocol, can now be directly signaled by designating LSRs, and the notice can now be provided at high speed in the order of several milliseconds to dozens of seconds. The reason for providing for two or more stages upstream is in consideration of the case wherein the first upstream label switching router is failing; then, the local repair method can set up the shortest recovery path, avoiding the first upstream label switching router. Further, this method does not require an extension of the protocol by using a list of IP addresses of LSRs, the list being carried by the RECORD_ROUTE object of an existing RSVP-TE, which is defined for loop prevention of the LSP, or Path Vector TLV of the LSP, for example.

Further, from the point of selecting a path merging LSR (PML), the PSL that switches from working path to recovery path can select a label switching router of an IP address downstream by two or more stages as the PML that receives both the working path and the recovery path.

In this manner, a protection section of the local repair method can be automatically obtained, and a maintenance setup is not needed. The reason for providing for two or more stages downstream is in consideration of the case where the first downstream label switching router is failing; then, the local repair method can set up the shortest recovery path, avoiding the first downstream label switching router. Further, this method does not require an extension of the protocol by using a list of IP addresses of LSRs, the list being carried by the RECORD_ROUTE object of an existing RSVP-TE, which is defined for loop prevention of LSPs, or Path Vector TLV of LSPs, for example. Further, the PSL and the PML can be made a pair by using an IP address list of a common LSR.

Further, from a viewpoint of the direction of the control LSP, the control LSP is set up in a direction opposite to the working path that is directed from the PSL to the PML.

In this manner, a PML that detects link failure and node failure can directly communicate to the PSL that performs switching at a higher speed than in the order of several dozens of seconds of the conventional method of flooding by the routing protocol. Further, by arranging the control LSP in the direction reverse to the route of the protection path, communication is possible on the control LSP before passing traffic on the protection path. Thus, the control LSP can also be used for determining normality of a path. Further, since the same information is transmitted to two or more PSLs from the PML, the label resources on this communication path are saved by mounting a multicasting LSP. Especially, the number of labels transmitted from the PML for the interface, which labels otherwise have to be prepared for each PSL concerning the failing link, can be reduced to one.

Further, from a viewpoint of the message transmitted on the control LSP, the message that is transmitted when switching to the control LSP can be prepared to include a message type, an IP address of the label switching router, and information on the unit of LSPs that is passing traffic on the working path that is to be switched.

Since direct communications are possible from the PML to the PSL using the control LSP, finer control is available between the PML and the PSL by defining the message on the control LSP. A protocol that carries out expansion can be newly mounted on the MPLS framework. Further, there are methods of expanding, namely, expanding existing RSVP-TE and existing CR-LDP, and extending the OAM function of the existing data link layer.

Further, from a viewpoint of processing at the PSL serving as the switching point of the traffic in units of LSPs that are bundled for every destination, when two or more LSPs are passing traffic on the working path from a specific PSL to a specific PML, switching from the working path to a recovery path can be carried out in the above-mentioned units of bundled LSPs.

Since conventional methods process each LSP individually when two or more LSPs connecting between a PSL and a PML are to be recovered, it takes a long time for setting up using protocols, such as RSVP-TE and CR-LDP. On the other hand, according to the present invention, these LSPs are bundled and processed as one path unit, eliminating multiple processing as mentioned above, and a shortened recovery time is attained.

Further, in the case of a working path, to which QoS or CoS is set, further grouping (subdividing the unit) is carried out for every QoS or CoS, respectively, and switching from the working path to the recovery path is carried out in groups of LSPs.

Although processing as a path unit or group eliminates the multiple processing as described above, the calculation process may be different for QoS and CoS, such as the maximum bandwidth required and the maximum delay of the LSP. In this case, processing for every attribute, i.e., QoS and CoS, is desired rather than processing by a path unit.

Accordingly, grouping is carried out for every QoS and CoS, and switching from the working path to the recovery path is carried out in groups of the LSPs. Consequently, the multiple processing is eliminated by arranging a path group for every attribute of QoS and CoS, and shortening of time can be attained.

Further, from a viewpoint of setting up the control LSP, the number of LSPs that are switched to the recovery path as a path unit and the identification numbers of the LSPs are transmitted from the PSL to the PML; and in response to the signal from the PML, the recovery path is set up in one action.

Since, conventionally, RSVP-TE and CR-LDP process only one LSP, mapping is necessary for the bundled LSPs and original LSPs by another means, even if one Bypass Tunnel is set up. On the other hand, according to the present invention, RSVP-TE and CR-LDP are made to transmit LSP-IDS that are stacked, and the number of LSP-IDs that are stacked, for LSPs running from the PSL to the PML. In this manner, mapping of the bundled LSPs on the PML and the original LSPs can be carried out, and PML setting up serving as recovery processing can be carried out in one action.

Further, from a viewpoint of performing forwarding for every path unit, forwarding can be performed by assigning a label for only a path section using a label stack in the recovery path established for every path unit as described above from the PSL to the PML.

In this manner, two or more LSPs are treated as a path unit, and by giving a label in units of LSPs, the amount of consumption of the labels by LSRs on the route of the Bypass Tunnel can be reduced, and the balance of the labels can be used for other LSPs.

Further, from a viewpoint of contents that are stored by a label processing unit when recording a path, the label processing unit can be arranged to record information about the working path and the recovery path so that a PSL can switch traffic to the recovery path, and switch back to the working path.

In order for a PSL to support the switching between the working path and the recovery path, the data structure of the LIB is formed in 2 sections, namely, primary data are referred to when the traffic passes through the working path, and secondary data are referred to when the traffic passes through the recovery path. Specifically, a pointer of the data reference is switched, and the switching between the primary data and the secondary data is carried out.

Further, from a viewpoint of storing an entry in the label processing unit, an entry for each of the working path and the recovery path can be stored to the label processing unit such that the label for the recovery path is deleted from the frame received by the PML through the recovery path, and mapping is carried out to the original LSP.

Then, for the PML to transmit the traffic that arrives from one of the working path and the recovery path to a downstream LSR, the LIB on the recovery path side is structured in two stages. At the first stage, the label is removed, received LIB being exclusively for the recovery path, and a label is used as if being received through the original LSP, and the process is handed over to the second stage LIB. The second stage LIB is referred to by both the working path and the recovery path, and the same processing as the working path is performed.

BRIEF EXPLANATION OF THE DRAWINGS

Other objects, features, and advantages of the present invention will become still clearer by reading the following explanation, referring to attached drawings.

FIG. 7 is a flow diagram for explaining an LDP operation sequence.

FIG. 8 is a flow diagram for explaining a CR-LDP operation sequence.

FIG. 9 is a flow diagram for explaining an RSVP-TE operation sequence.

FIG. 10 is a flow diagram for explaining loop prevention by MPLS.

FIG. 20 is a flow diagram for explaining a calculation method for determining an LSR, to which a notice of failure should be transmitted.

FIG. 22 is a flow diagram for explaining an example of setting up between PSL and PML using RSVP-TE and CR-LDP.

FIG. 23 is a table for explaining a transmission process of PSL.

FIG. 24 is a table for explaining a switching process of PSL when restoring from failure.

FIG. 25 is a table for explaining the transmission process of a relay node.

BEST MODE OF THE PRESENT INVENTION

Figure 1:
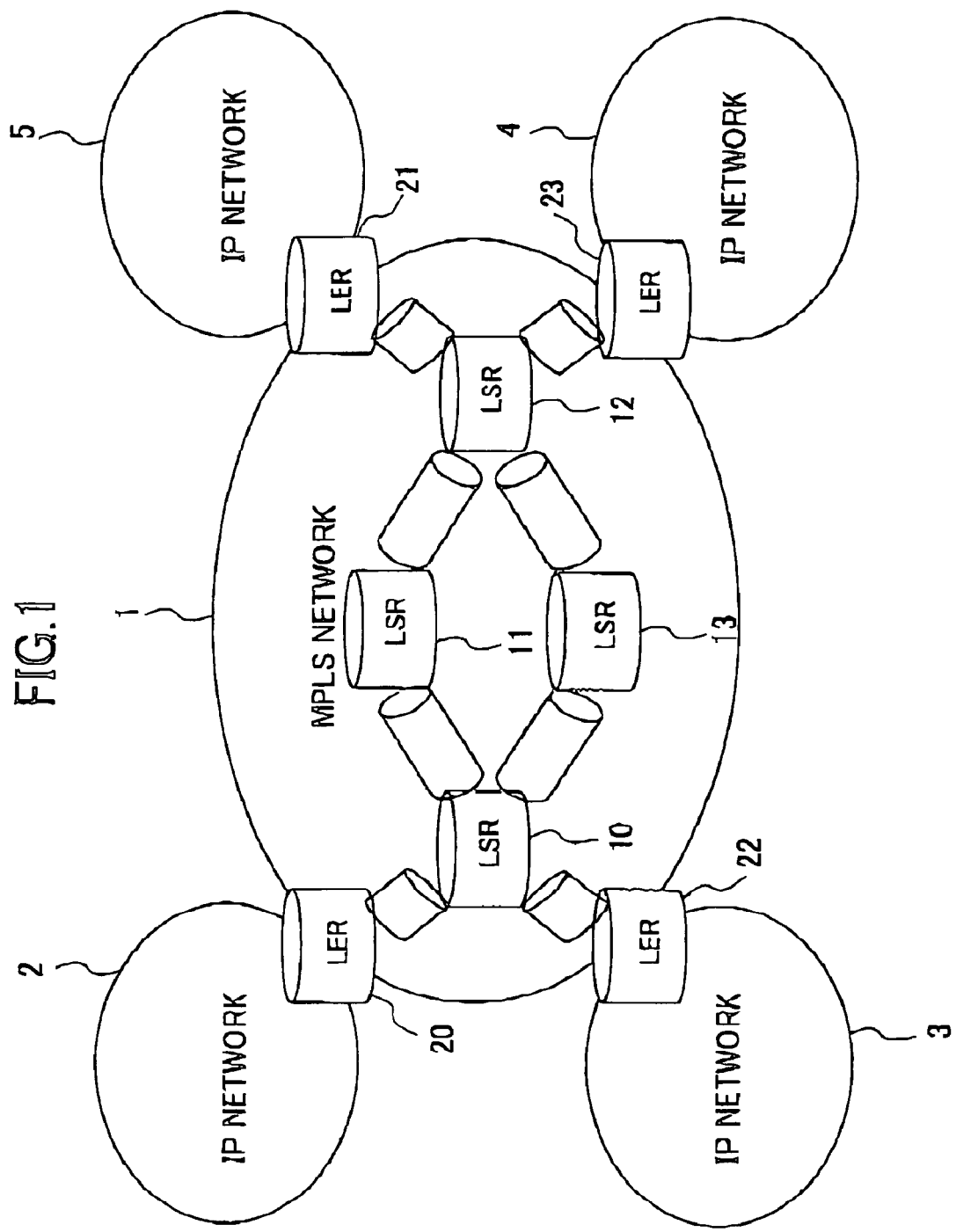
FIG. 1 is schematic diagram of an MPLS network model.

As routers LSRs having MPLS functions in an MPLS network 1, routers LSR-10 through LSR-13 are provided as shown in FIG. 1, and as LERs located at boundaries with IP networks, LER-20 through LER-23 are provided LER-20 is connected to an IP network 2, LER-21 is connected to an IP network 5, LER-22 is connected to an IP network 3, and LER-23 is connected to an IP network 4.

An LSP that goes from the IP network 2 to the IP network 5 is named LSP-1, and another LSP that goes from the IP network 3 to the IP network 4 is named LSP-2, wherein LSR-10, LSR-11, and LSR-12 are common LSRs to LSP-1 and LSP-2.

Figure 2:
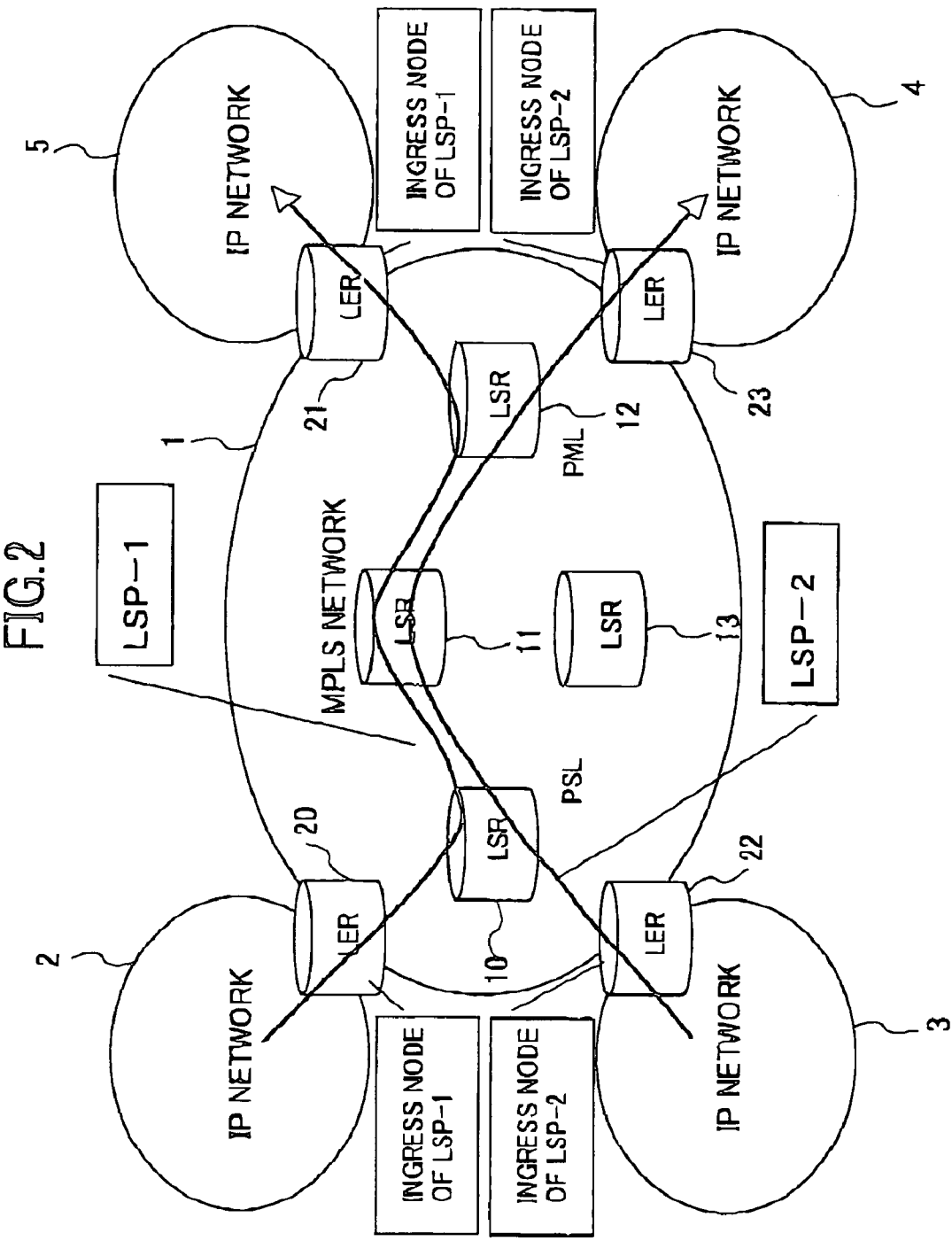
FIG. 2 is schematic diagram of an LSP setting model in the MPLS network.
Figure 3:
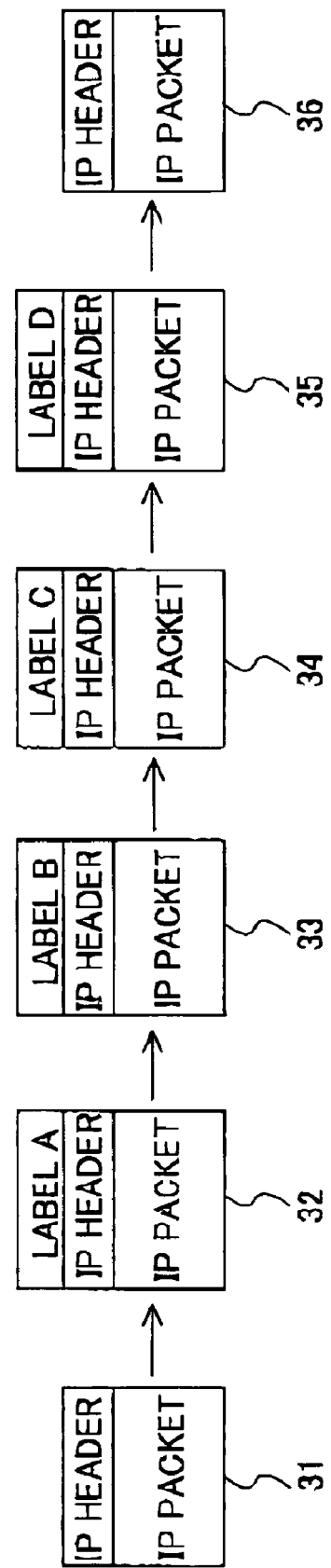
FIG. 3 is a data diagram for explaining attaching, swapping, and deleting a label.
Figure 4:
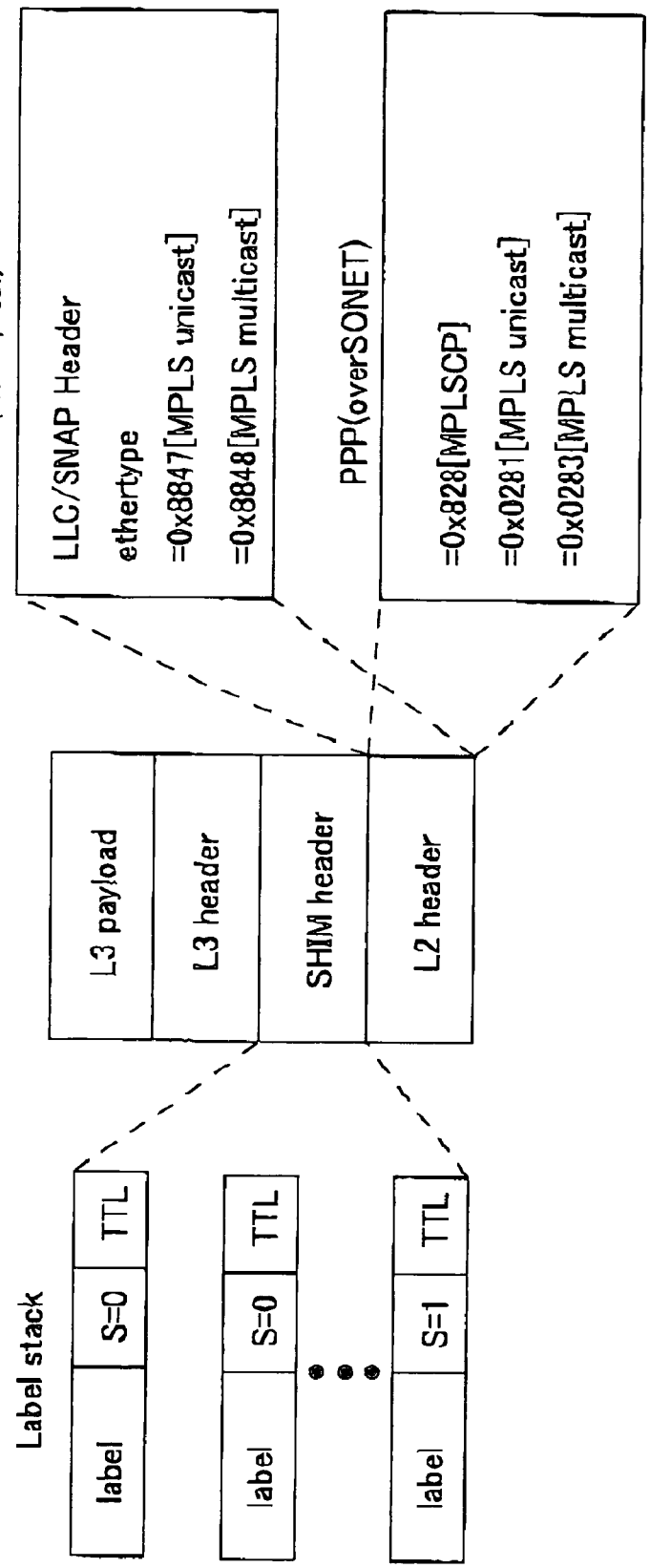
FIG. 4 is a data diagram for explaining the label used by MPLS.
Figure 5:
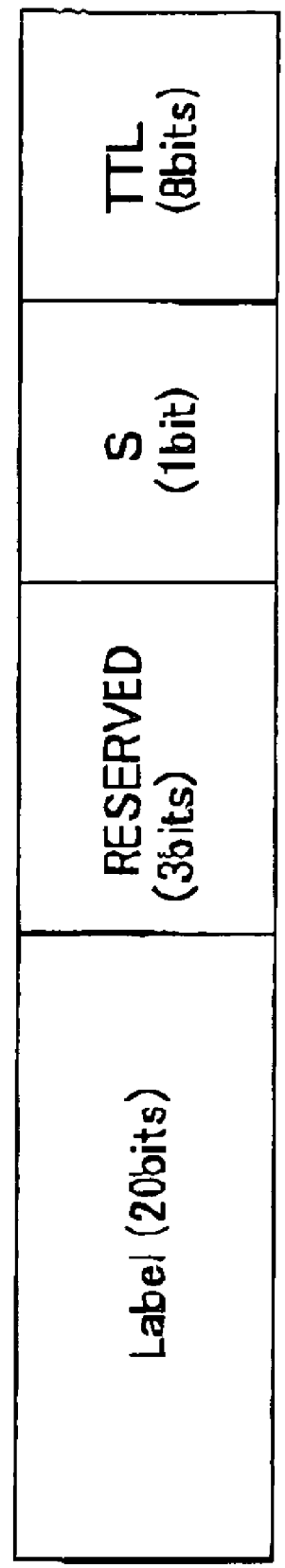
FIG. 5 is a data diagram for explaining a SHIM header.
Figure 6:
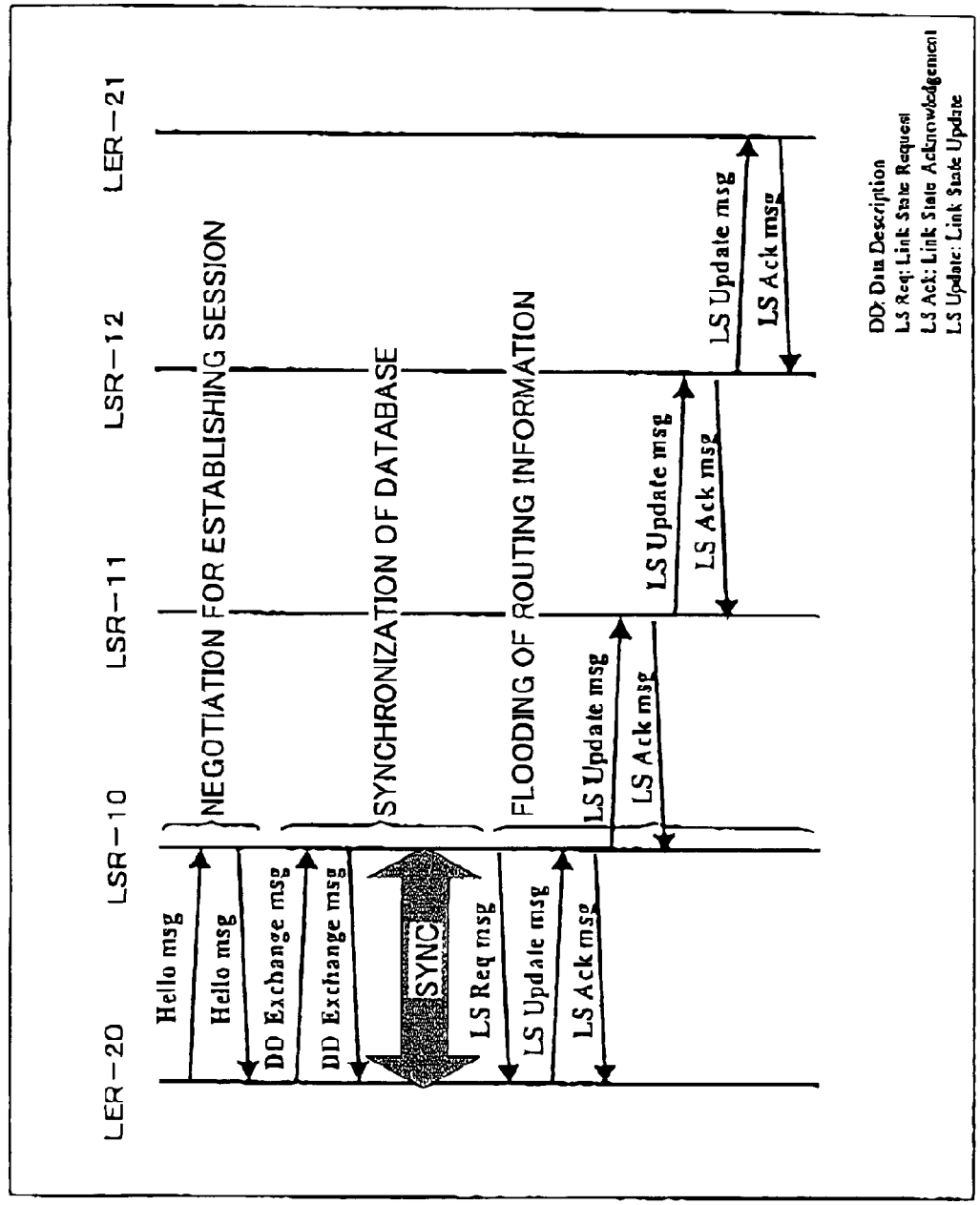
FIG. 6 is a flow diagram for explaining an OSPF operation sequence.
Figure 11:
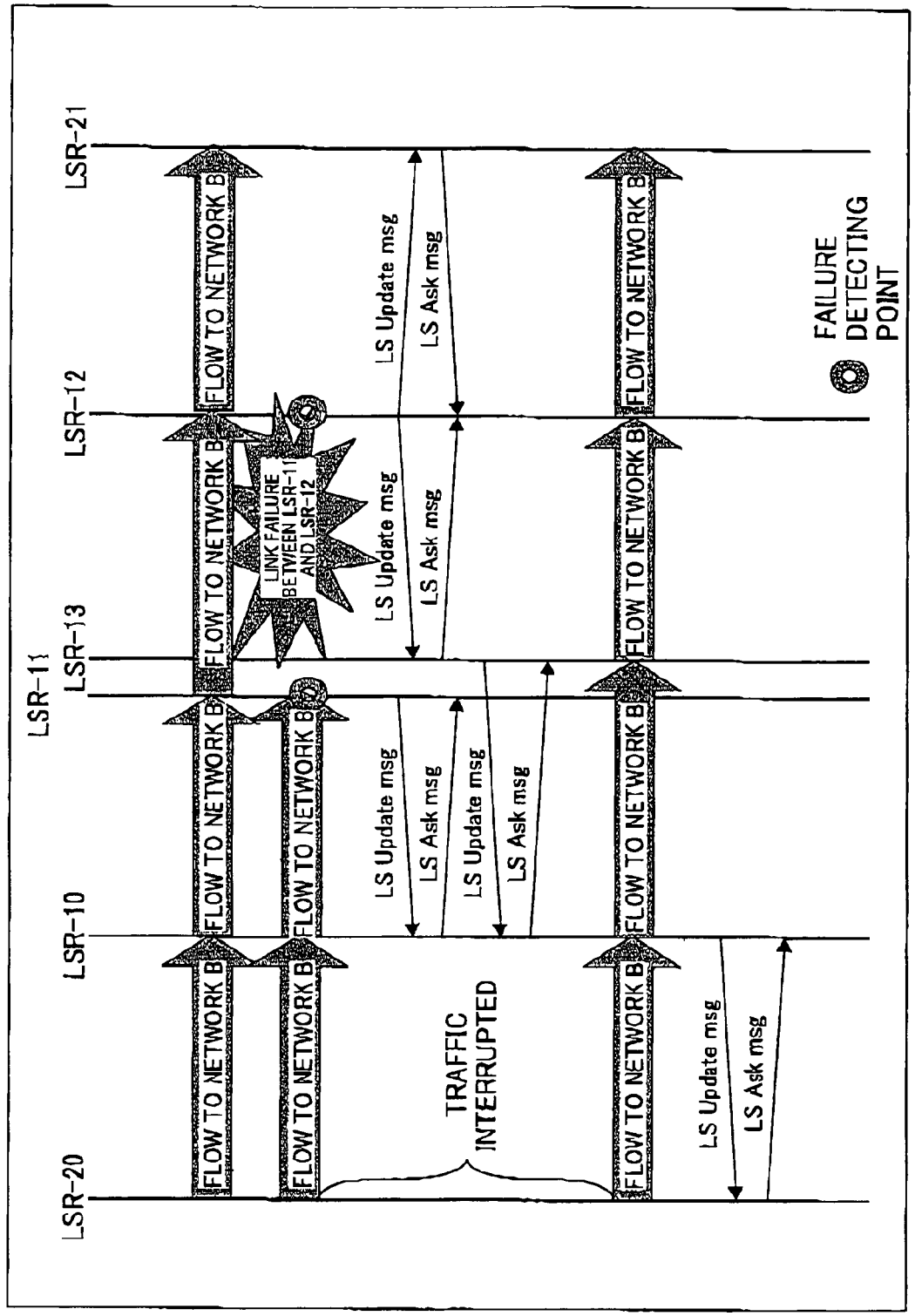
FIG. 11 is a flow diagram for explaining re-routing (at link failure) in an IP network.
Figure 12:
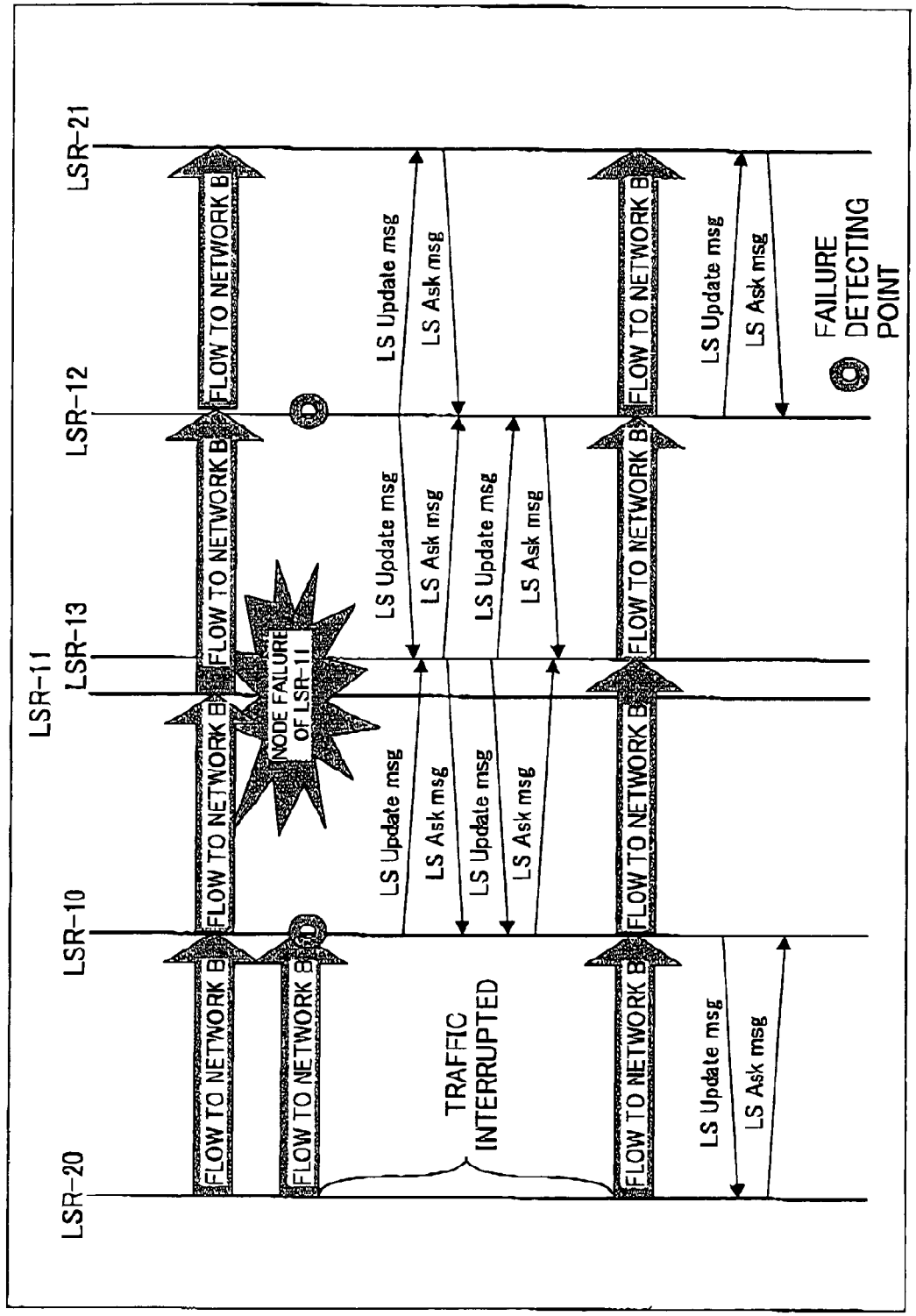
FIG. 12 is a flow diagram for explaining re-routing (at node failure) in the IP network.
Figure 13:
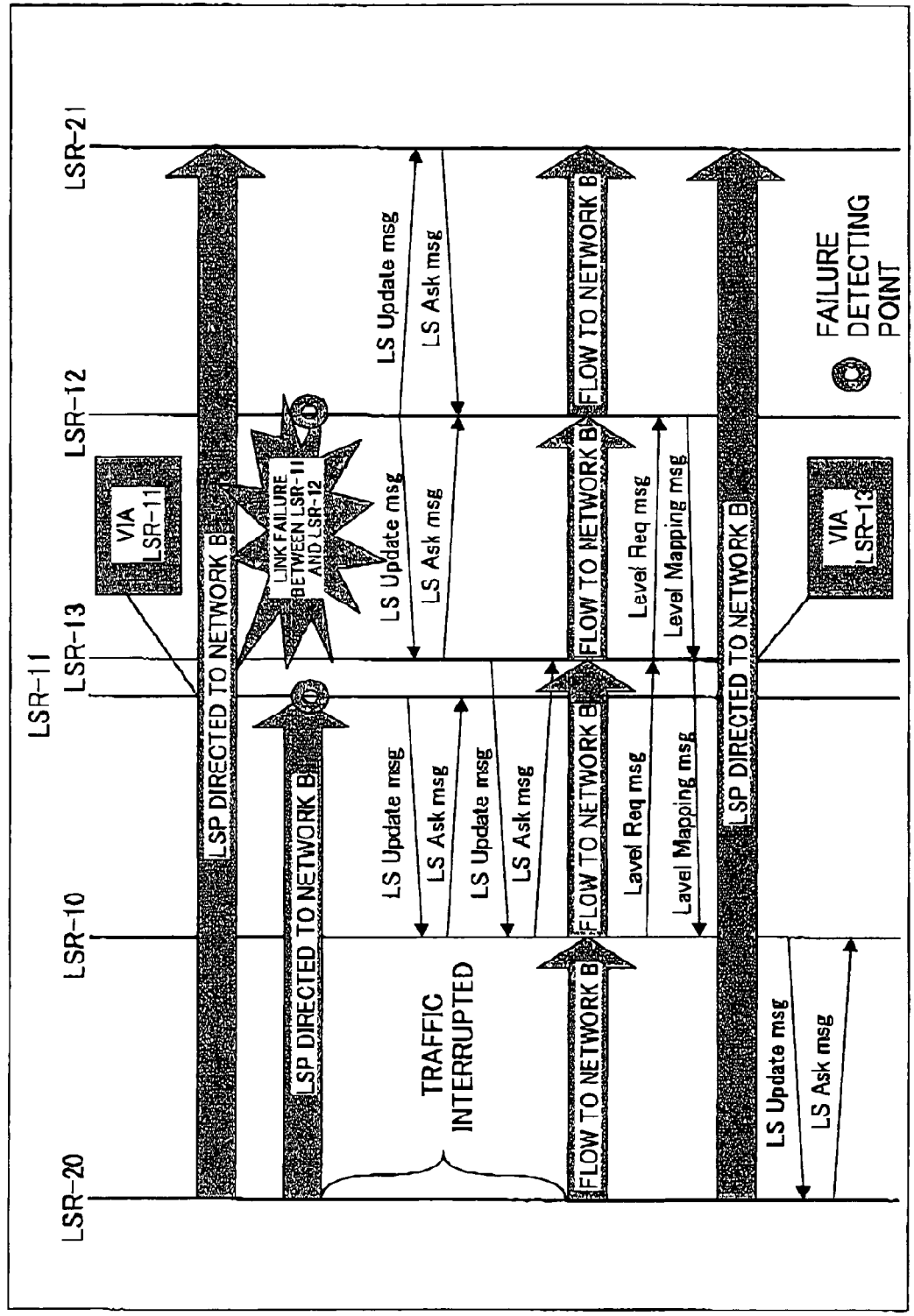
FIG. 13 is a flow diagram for explaining re-routing (at link failure) in an MPLS network.
Figure 14:
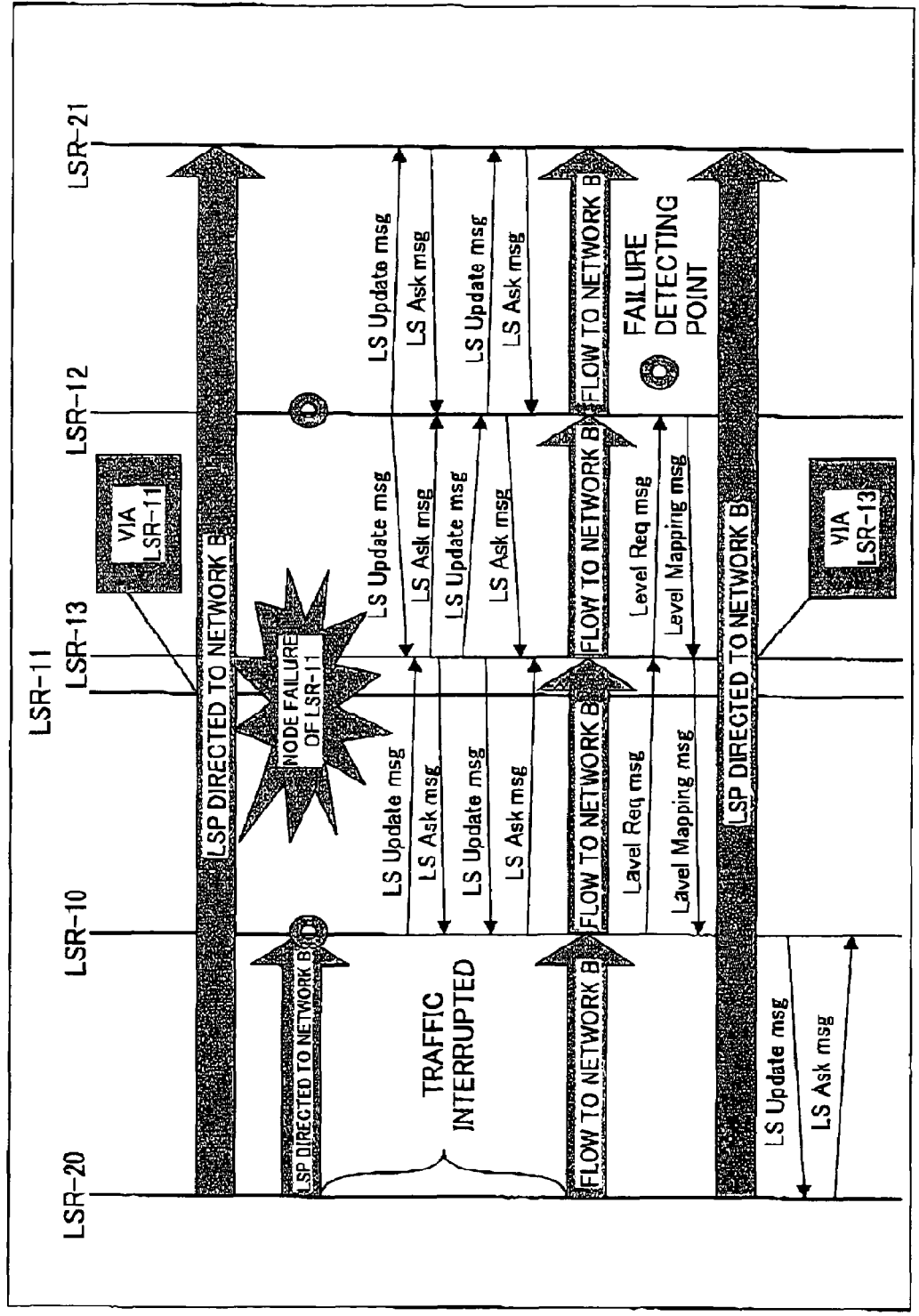
FIG. 14 is a flow diagram for explaining re-routing (at node failure) in the MPLS network.
Figure 15:
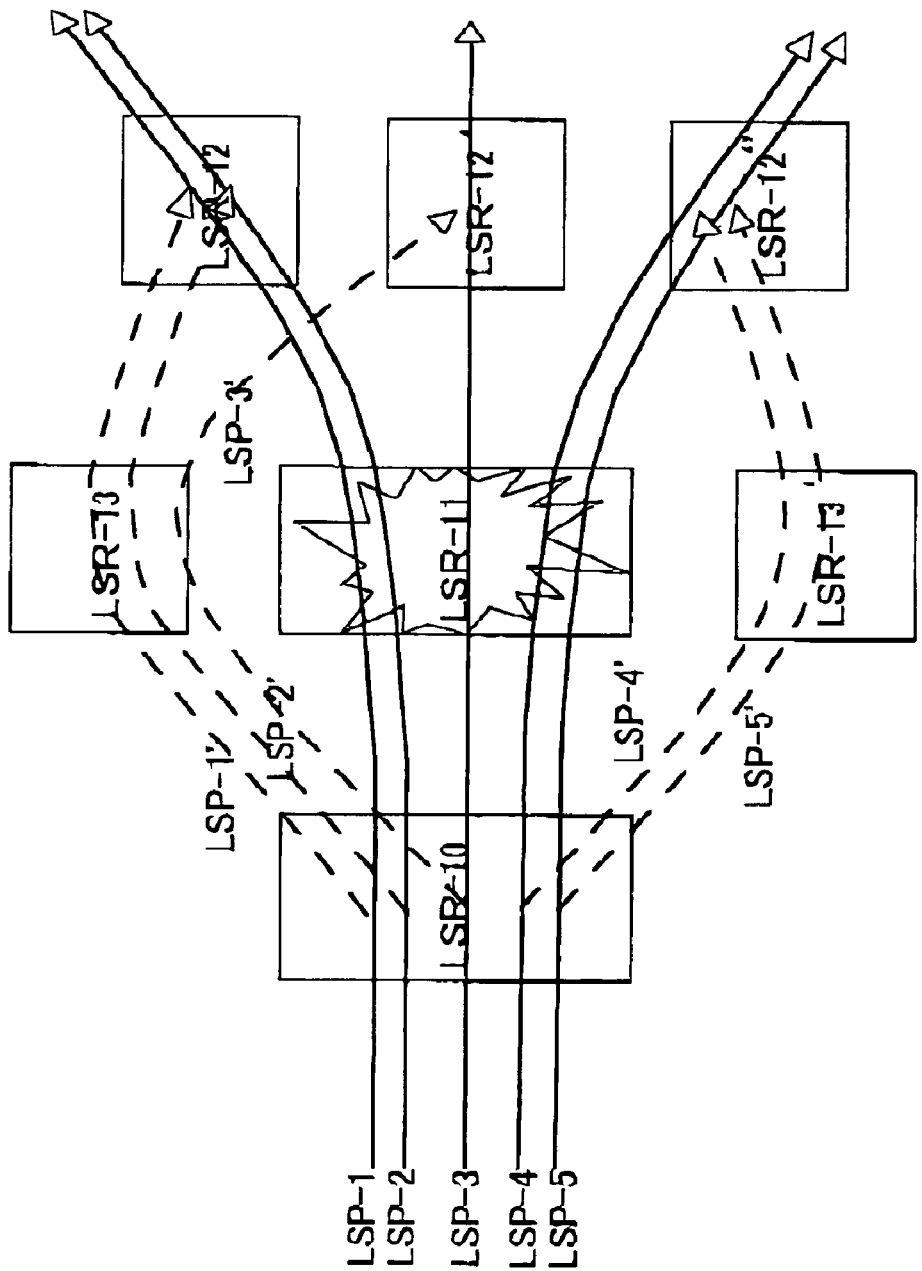
FIG. 15 is a flow diagram for explaining conventional MPLS restoration.
Figure 16:
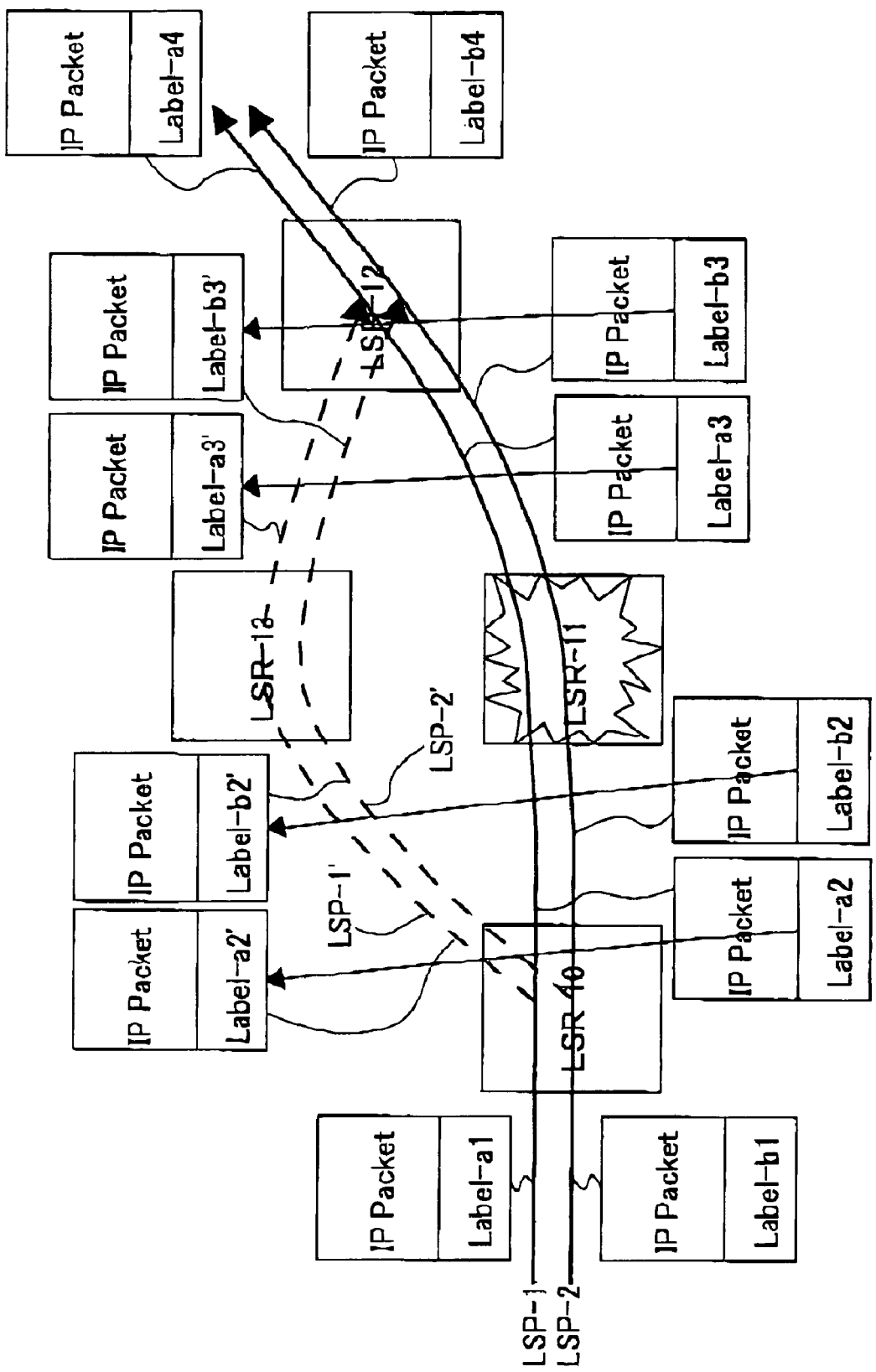
FIG. 16 is a flow diagram for explaining a data format of the conventional MPLS restoration.
Figure 17:
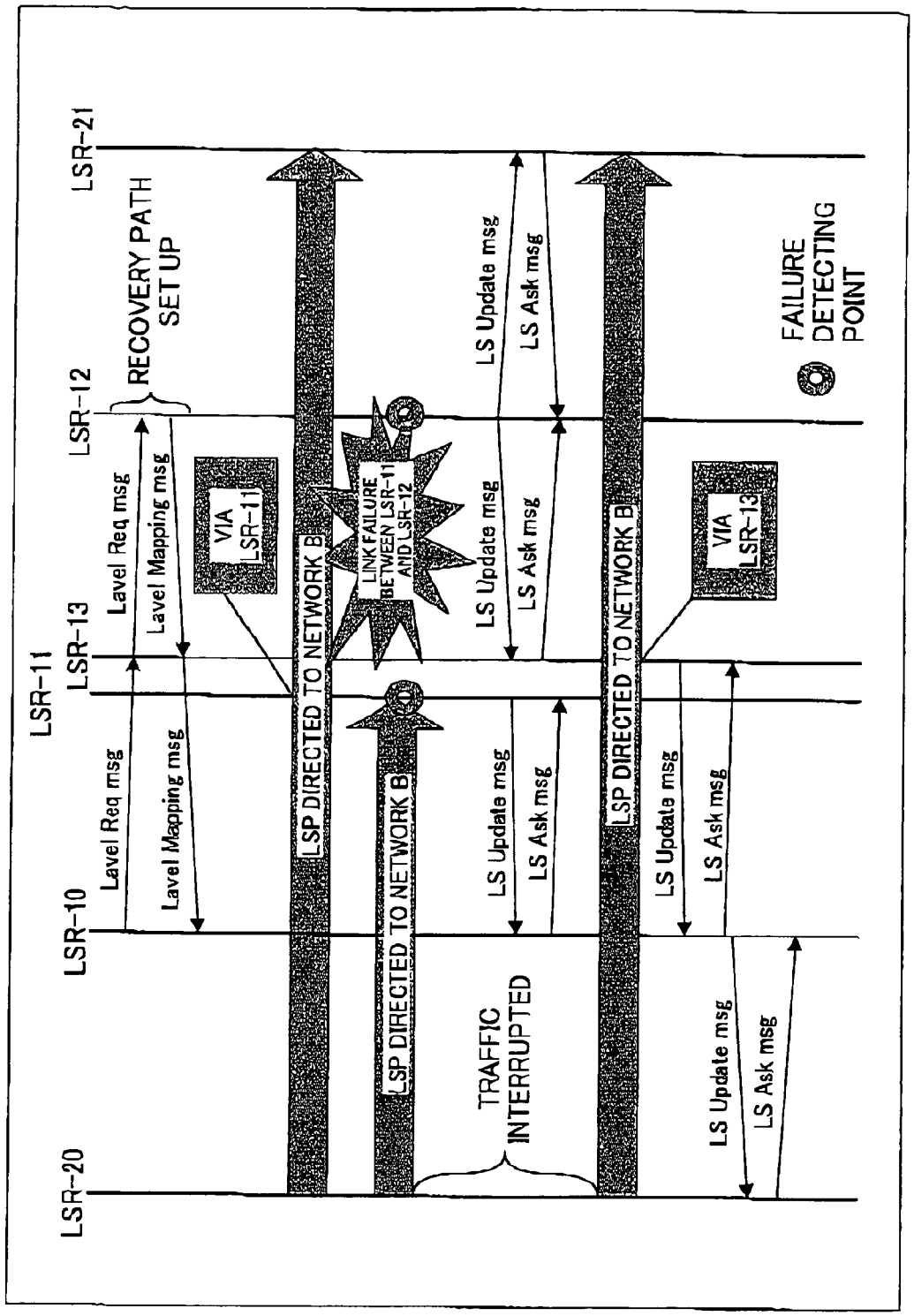
FIG. 17 is a flow diagram for explaining re-routing (at link failure) in a CR-MPLS network.
Figure 18:
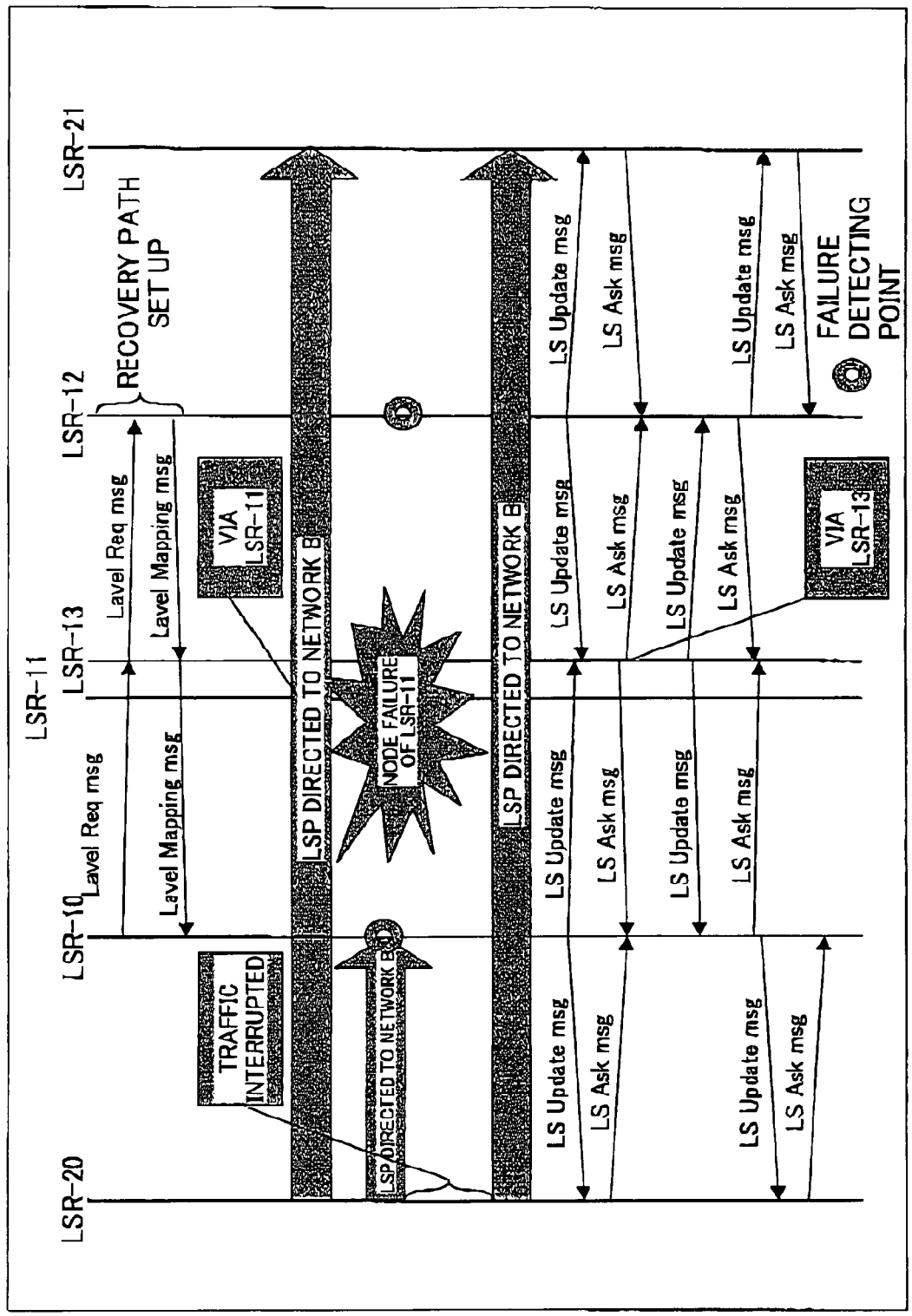
FIG. 18 is a flow diagram explaining re-routing (at node failure) in the CR-MPLS network.

As shown in FIG. 2, for the LSP-1, LER-20 serves as the Ingress Node, and LER-21 serves as the Egress Node; for LSP-2, LER-22 serves as the Ingress Node and LER-23 serves as the Egress Node.

Figure 19:
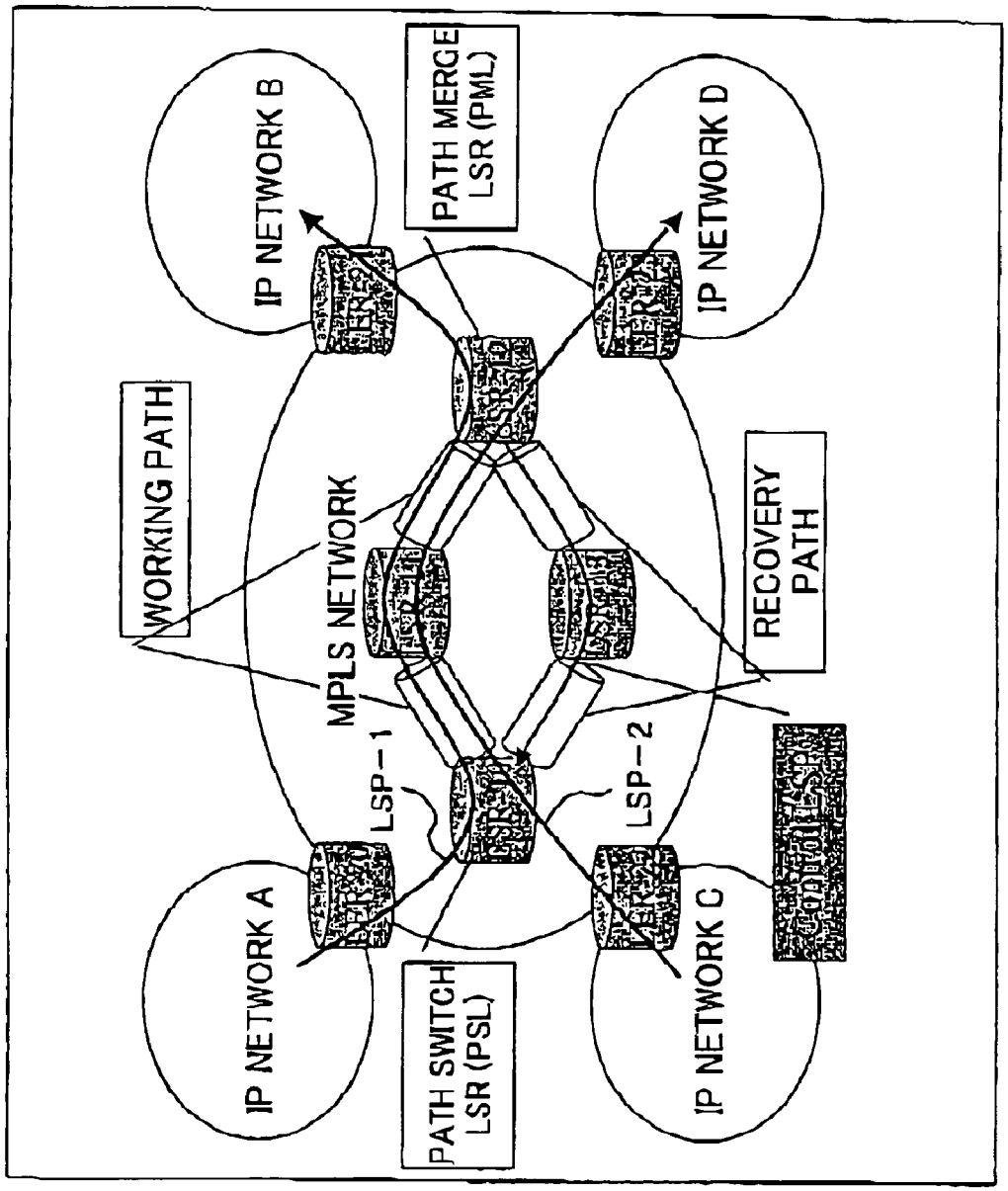
FIG. 19 is a flow diagram for explaining a recovery model of a network.

Here, a recovery model is considered supposing link failure between LSR-11 and LSR-12, or node failure of LSR-11 being occurred. LSP-1 and LSP-2 share LSR-10, LSR-11, and LSR-12. Since traffic is currently flowing on the paths (LSP-1 and LSP-2) each of the paths is called a working path for this section. When a recovery mechanism operates, an LSR that switches the path is called a path switching LSR (PSL), and an LSR at which a path after switching merges the original path is called a path merging LSR (PML). A path between the same terminal points of LSR-10 serving as the PSL and LSR-12 serving as the PML through LSR-13 is called a recovery path for the section made on the route (in the case of protection, it is specifically called a protection path). This situation is shown in FIG. 19.

In the following, the message and object (TLV) that are used by RSVP-TE, CR-LDP, and LDP are abstracted, and used as follows.

Label request message: a PATH message of RSVP-TE, a Label Request message of CR-LDP/LDP Label distribution message: an RESV message of RSVP-TE, a Label Mapping message of CR-LDP/LDP Loop prevention data: a RECORD_ROUTE object of RSVP-TE, a Path Vector TLV of CR-LDP/LDP.

Below, the present invention is explained in sequence based on the following:

Process at the router (LSR-12) that detects link failure or node failure

Process at the router (PSL) that switches the path to the recovery path

Process at a relay node of the recovery path

Process at PML

LSR structure that realizes the above processes.

(3-1) Process at the Router that Detects Link Failure or Node Failure

A process at the router that detects failure or node failure is explained using FIG. 19 and FIG. 20. Here, in this example, LSR-12 is the router that detects link failure or node failure.

(1) LSP-1 is set up between LER-20 serving as the Ingress Node and LER-21 serving as the Egress Node using one of RSVP-TE, CR-LDP, and LDP. LSR-12 receives a label request message from the link that is linked to LSR-11, and reserves resources for QoS and CoS in LSR-12. If the reservation is secured, LSR-12 transmits the label request message to a link that is linked to LER-21.

(2) Then, a label distribution message is received from the link that is linked to LER-21, and if there is no error in the message, a setup of the above-mentioned resources and assignment of the label that is to be received are carried out. If this process is successfully performed, LSR-12 transmits the label distribution message that contains the label that can be processed by LSR-12 onto the link that is linked to LSR-11.

(3) Based on a request of a loop prevention function from the Ingress Node, LSR-12 receives an LSR-ID list that begins at the Ingress Node as loop prevention data, which is included in the label request message received from the link that is linked to LSR-11 (for example, FIG. 20B shows the ID list of LSRs of LSP-1 and LSP-2 for LSR-12).

(4) As the LSR to which the failure notice should be transmitted when the failure is detected, the IP address of an LSR that is placed two stages upstream of the traffic on the LSR-ID list is selected for every LSP. In the case of FIG. 20, LSR-10 is selected as the LSR to which the failure notice is transmitted for LSP-1 and LSP-2.

(5) In order to accelerate the process from failure detection to notice transmission, and to cut down the amount of data, duplication included in the selected LSR is eliminated, and data corresponding to the link whose failure is to be detected are stored in advance, and relations are attached.

(6) For the LSR from which the duplication is eliminated, the route of a control LSP is used in an opposite direction to LSP-1 and LSP-2. Since the control LSP needs to reach the LSR to which the notice should be transmitted without passing through LSRs on LSP-1 and LSP-2, that is the working path, the metric in the routing information of the link provided by LSP-1 and LSP-2 is made the greatest so as not to be selected. As the result, a route that goes from LSR-12 to LSR-13, and reaches LSR-10 is selected as the control LSP.

(7) In accordance with the route calculated as above, the control LSP is set up using RSVP-TE or CR-LDP as shown in FIG. 19.

(8) When LSR-12 detects failure of a link of LSP-1 or LSP-2, the failure message is transmitted to LSR-10 on the control LSP that is set up. The failure message contains a message type, the IP address of the transmitting label switching router, and the unit of LSPs that is passing traffic on the working path that is to be switched.

(3-2) Process of a Router (PSL) that Switches to a Recovery Path

PSL (LSR-10) that receives the failure message on the control LSP performs the following processes.

(1) Setting up is performed from LER-20 serving as the Ingress Node to LER-21 serving as the Egress Node of LSP-1 using RSVP-TE, CR-LDP, or LDP. LSR-10 receives the label request message from the link that is linked to LER-20, and reservation of the resources for QoS and CoS in LSR-10 is carried out. If the reservation can be secured, LSR-10 transmits the label request message to the link that is linked to LSR-11.

(2) Then, the label distribution message is received from the link that is linked to LSR-11, and if there is no error in the message, the resource is set up, and the label to be received is assigned. If the process is successful, LSR-10 transmits the label distribution message containing a label that can be processed by LSR-10 to the link that is linked to LER-20.

Figures 21A, 21B, 21C:
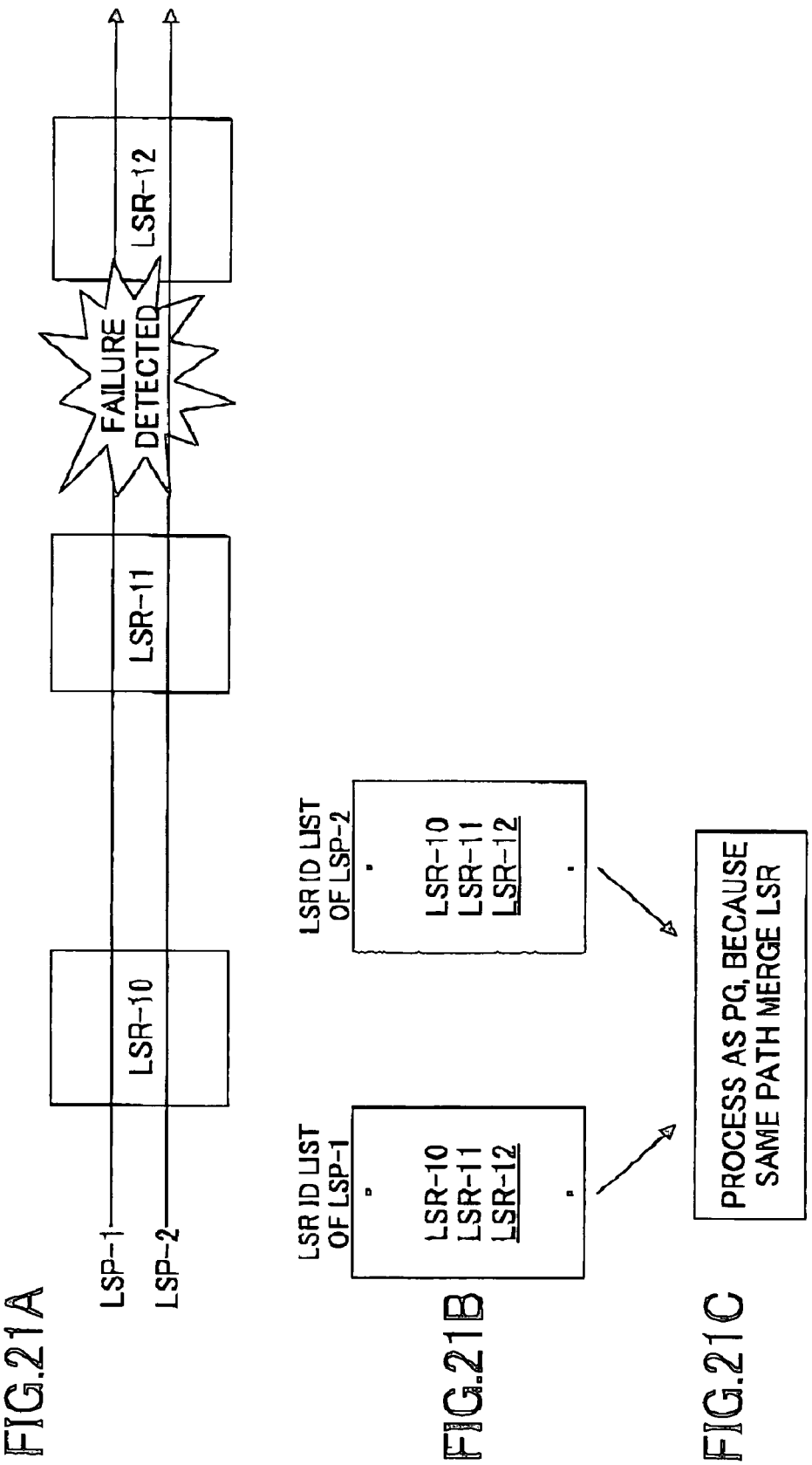
FIG. 21 is a flow diagram for explaining a calculation method of PML, and units of processing.

(3) Based on a request for a loop prevention function from the Egress Node, LSR-10 obtains an LSR-ID list (for example, FIG. 21B) serving as loop prevention data, beginning with the Egress Node, in the label distribution message received from the link that is linked to LSR-11.

(4) An LSR (PML), at which the LSP of a recovery path is returned and traffic is returned to the original LSP, is determined for every LSP. In order to recover at high speed, a local repair method is used, and further, in consideration of node failure, an LSR two stages downstream is selected as the PML. The same process is performed on LSP-2.

In the case of FIG. 21, LSR-12 is selected by LSP-1, and by LSP-2.

(5) Next, LSPs, the PMLs of which are the same, are determined. Since LSR-12 is the PML for both LSP-1 and LSP-2 of FIG. 21, LSP-1 and LSP-2 are grouped as a processing unit PG (protection group).

(6) Further, when parameters of QoS and CoS are specified for LSP-1 and LSP-2, if the parameters of QoS and CoS of these two LSPs are compatible, LSP-1 and LSP-2 are grouped in the same PG. The compatible parameters are used by the Bypass Tunnel generated per PG. In the case that the parameters are not compatible, LSP-1 and LSP-2 are processed as separate PGs, and separate Bypass Tunnels are prepared.

(7) Then, the LSP is actually set up in the sequence of LSR-10, LSR-13, and LSR-12 using RSVP-TE or CR-LDP after determining the section that is to be recovered, and the unit of LSPs for the process.

(8) In order to carry out the process in a package at this time, as shown in FIG. 22B, the object of RSVP-TE, or TLV of CR-LDP, is extended, and transmits the information about the traffic that flows through the LSP set up as the PG to the PML. The extended object or TLV stores LSP-ID for identifying LSPs and the number of LSPs contained in a PG, and a PATH message of RSVP-TE or a Label Request message of CR-LDP is transmitted.

(9) The data of the LIB is set up when the RESV message of RSVP-TE or the Label Mapping message of CR-LDP containing the label is received as shown in FIG. 22C. Then, forwarding according to the label is started.

(10) The LIB of the PSL at this time is shown in FIG. 23. AS for entries concerning LSP-1 and LSP-2, action is changed from Label Swap (label switching) (FIG. 23B) to Label Push (label assignment) (FIG. 23C), and OUT-FORT and OUT-LABEL are updated.

(11) Further, the data format contains labels indicating individual LSPs and a label for the Bypass Tunnel, which are stacked, and only the latter label is used in the Bypass Tunnel.

Figure 29:
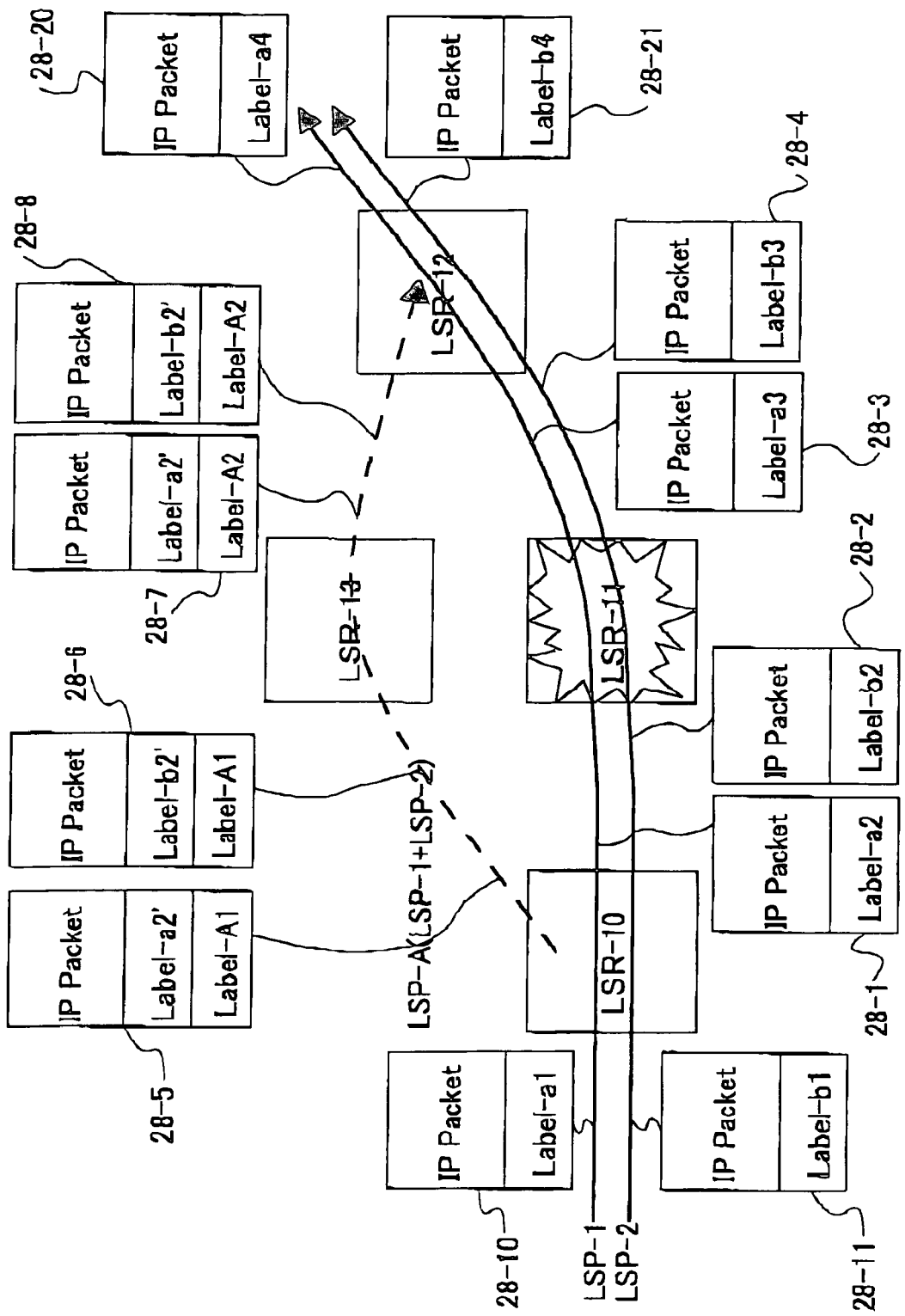
FIG. 29 is a flow diagram for explaining a format after MPLS restoration according to the present invention

Situations at this time are shown in FIG. 29. At the PSL (LSR-10), in normal operations, an IP packet 28-10 (Label-a1) is changed into an IP packet 28-1 (Label-a2) on LSP-1, and an IP packet 28-11 (Label-b1) is changed into an IP packet 28-2 (Label-b2) on LSP-2.

After restoration, the PSL (LSR-10) changes the IP packet 28-10 (Label-a1) on LSP-1 into an IP packet 28-5 (Label-a2'-Label-A1), and changes the IP packet 28-11 (Label-b1) on LSP-2 into an IP packet 28-6 (Label-b2'-Label-A1).

(12) When performing switching back after the failure restoration, as shown in FIG. 24, the entry of the LIB in the Ingress Node of the recovery path is updated so that traffic may flow through the working path. Specifically, a process (for example, FIG. 24B) that assigns (pushes) the label to the Bypass Tunnel changes to the label used by the working path (for example, FIG. 24C), and traffic is returned to the working path. In the case that the recovery path is set up automatically by LSR, the setup is deleted using RSVP-TE or CR-LOP at this time.

(3-3) Process of a Relay Node (LSR-13 in FIG. 19) of a Recovery Path (1) LSP-A is set up from LSR-10 serving as the Ingress Node to LSR-12 serving as the Egress Node using RSVP-TE or CR-LDP. LSR-13 receives a label request message from the link that is linked to LSR-10, and reserves the resources for QoS and CoS in LSR-13. If the reservation can be performed, LSR-13 transmits the label request message to the link that is linked to LSR-12.

(2) Then, a label distribution message is received from the link that is linked to LSR-12, and if there is no error in the message, the resources are set up and the label to be received is assigned. If processing is successful, LSR-13 transmits the label distribution message that contains the label that can be processed by LSR-13 to the link that is linked to LSR-10.

(3) At this time, only an LSP for the Bypass Tunnel is processed, and processing of LSP-1 and LSP-2 that are stacked to be forwarded is not performed, but rather, the mapping information on LSP-1 and LSP-2 is transmitted as it is without being processed.

(4) the LIB of LSR-13 is shown in FIG. 25B.

(5) Label request/distribution used by the Bypass Tunnel between LSR-10 and LSR-13 are performed using RSVP-TE or CR-LDP using Constraint Based Routing so that routing specification may not be determined by using the IP routing information.

(6) Further, in the label forwarding process after the label for Bypass Tunnel is acquired, the data format in this Bypass Tunnel section contains the labels (a2, a3, b2, b3) that indicate individual LSPs, and the labels for Bypass Tunnel (A1, A2), which are stacked, as shown in FIG. 29, and only the latter label is used by the Bypass Tunnel.

That is, the relay node (LSR-13) switches the IP packet 28-5 (Label-a2'-Label-A1) and the IP packet 28-6 (Label-b2'-Label-A1) into an IP packet 28-7 (Label-a2'-Label-A2) and an IP packet 28-8 (Label-b2'-Label-A2) in the PG of LSP-1 and LSP-2, respectively.

(3-4) Process of PML (1) LSP-1 is set up from LER-20 serving as the Ingress Node to LER-21 serving as the Egress Node using RSVP-TE, CR-LDP, or LDP. LSR-12 receives a label request message from the link that is linked to LSR-11, and reserves the resources for QoS and CoS in LSR-12. If the reservation can be performed, LSR-12 transmits the label request message to the link that is linked to LER-21.

(2) Then, a label distribution message is received from the link that is linked to LER-21, and if there is no error in the message, the resources are set up and the label to be received is assigned. If this process is successful, LSR-12 transmits the label distribution message that contains the label that can be processed by LSR-12 onto the link that is linked to LSR-11.

(3) LSP-A that is a Bypass Tunnel is set up from LSR-10 serving as the Ingress Node to LSR-12 serving as the egress Node using RSVP-TE or CR-LDP. LSR-12 is the Egress Node of the Bypass Tunnel, and setup of the resources and assignment of the label are performed in the label request message that is received from the link that is linked to LSR-13. If this process is successful, LSR-12 transmits the label distribution message that contains the label assigned by LSR-12 onto the link that is linked to LSR-13.

(4) Further, at this time, the object of RSVP-TE, or TLV of CR-LDP performs mapping according to the mapping information on LSP-2 and LSP-1, that is the PG transmitted with LSP-1 and LSP-2, that are already present within LSR-12.

(5) As shown in FIG. 29, the labels for Bypass Tunnel are removed from the data format in the Egress Node, and the data formats are distributed for original LSP-1 and LSP-2 according to the entries described by the values of the labels of LSP-1 and LSP-2.

That is, in the PG of LSP-1 and LSP-2, the PML (LSR-12) switches an IP packet 28-7 (Label-a2'-Label-A2) into an IP packet 28-20 (Label-a4) on LSP-1, and switches an IP packet 28-8 (Label-b2'-Label-A2) into an IP packet 28-21 (Label-b4) on LSP-2.

Figures 26A, 26B, 26C:
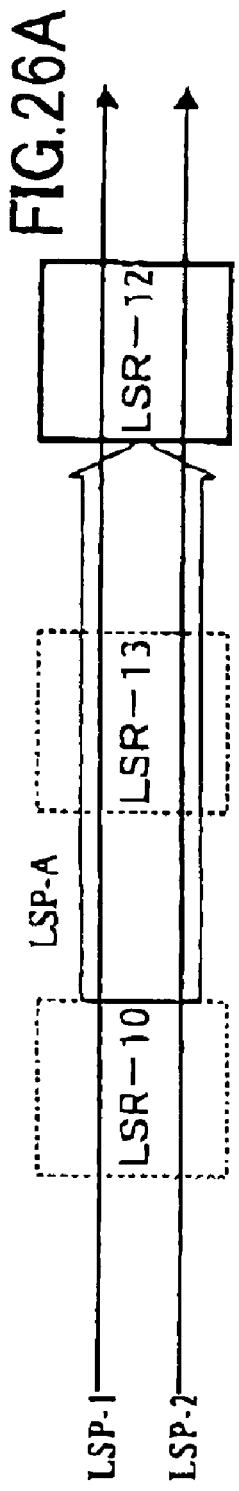
FIG. 26 is a table for explaining the transmission process by PML.

(6) The LIB in LSR-12 is shown in FIG. 26B. Here, FIG. 26A shows the LIB in LSR-12 before restoration.

(3-5) An example of LSR structure

Figure 27:
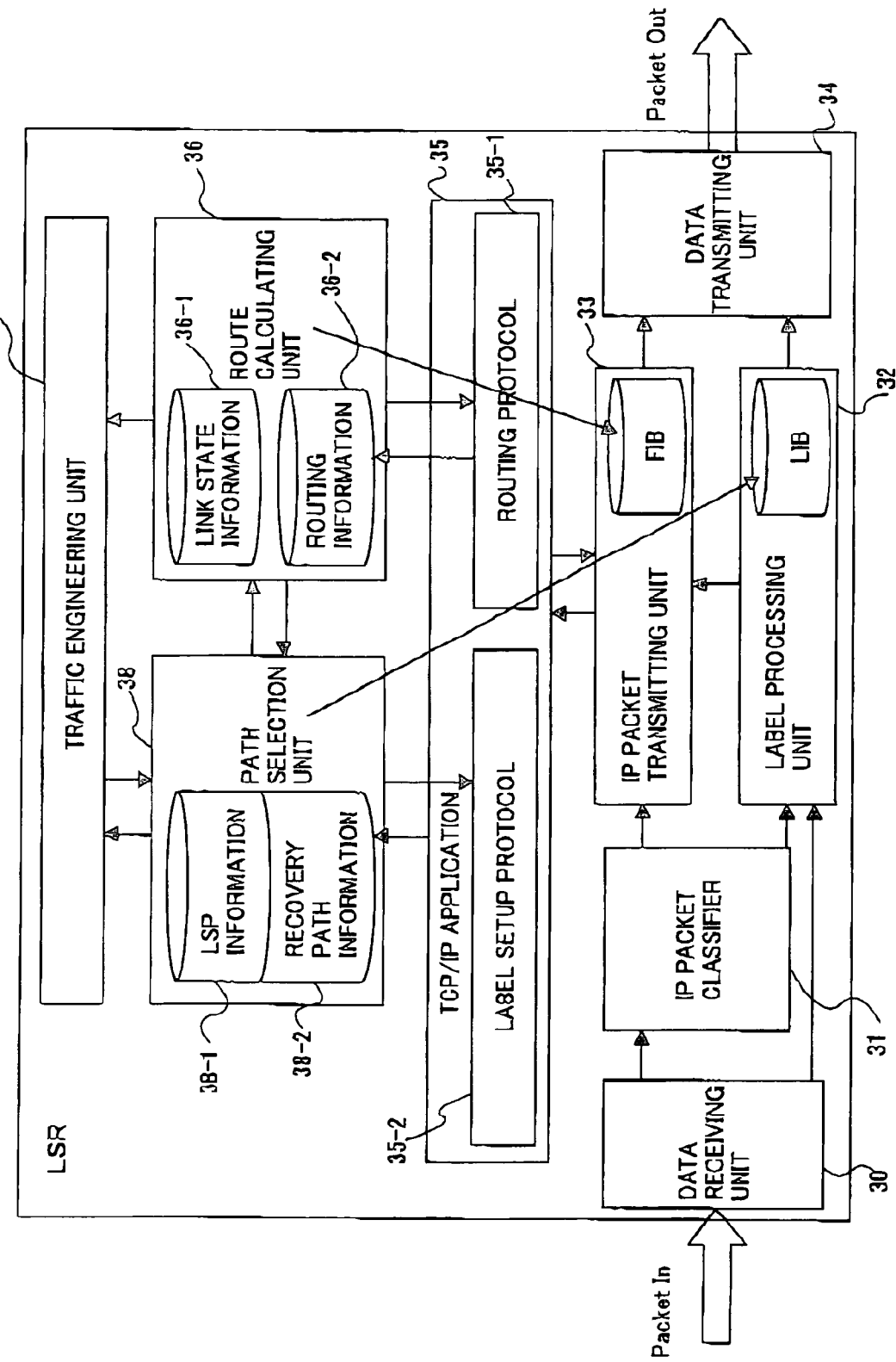
FIG. 27 is a block diagram for explaining functional blocks of LSR.
Figure 28:
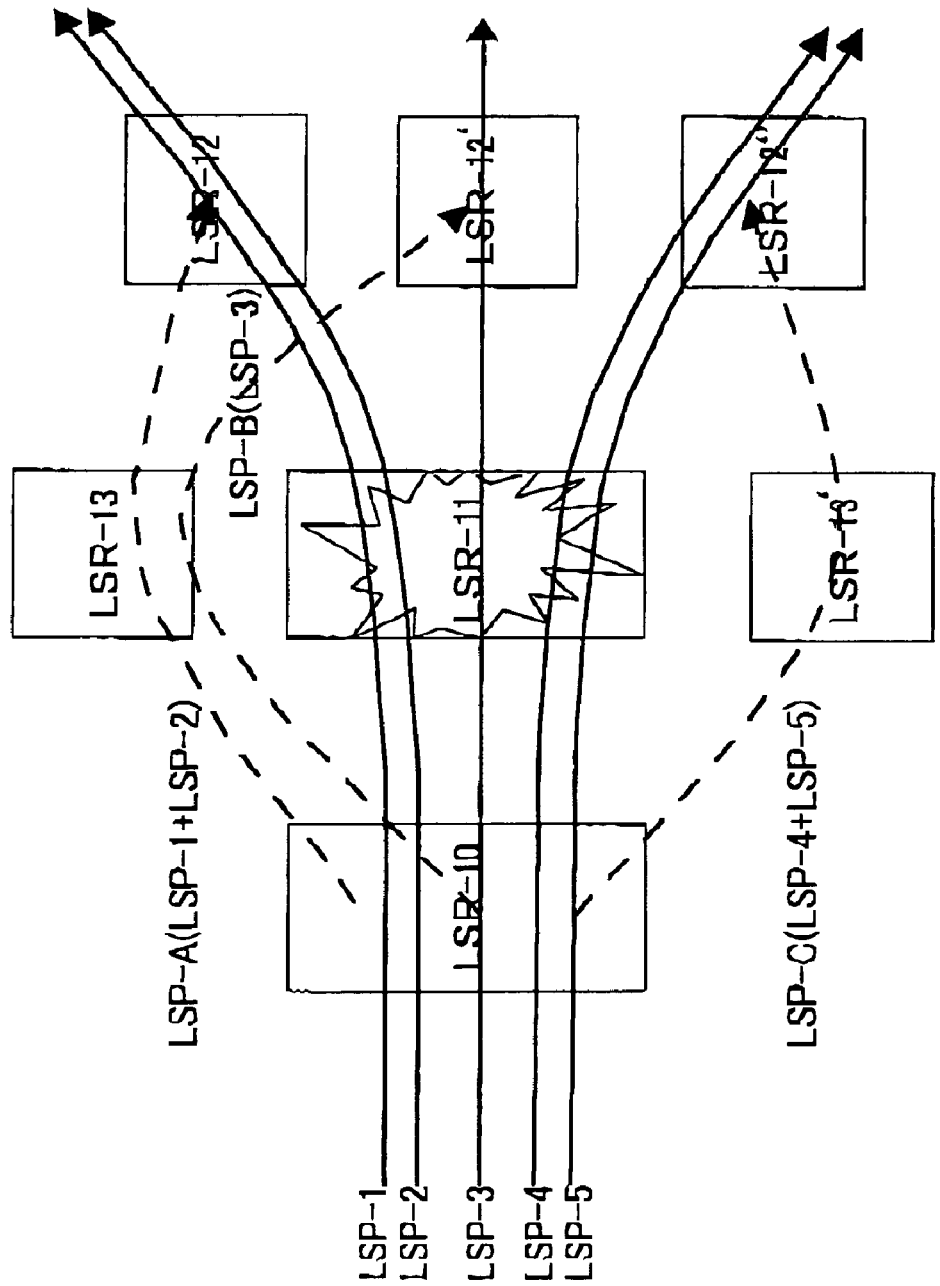
FIG. 28 is a flow diagram for explaining MPLS restoration according to the present invention.

An example of how an LSR is structured is shown in FIG. 27.

(1) A data receiving unit 30 and a data transmitting unit 34 perform reception from a circuit and transmission of a packet, respectively.

(2) An IP packet Classifier 31 classifies IP packets, and extracts packets that are to be transmitted with a label.

(3) A label processing unit 32 performs a transmission process using the label attached to the packet. The database called LIB is referred to in the transmission process.

(4) An IP packet transmitting unit 33 performs a transmission process using a destination IP address, wherein reference is made to a database called FIB.

(5) A TCP/IP application 35 is mounted as a daemon using a Socket interface. A daemon of RSVP-TE and LDP (including a CR-LDP function) is mounted as a label setup protocol 35-2. Further, daemons of OSPF and BGP-4 are mounted as a routing protocol 35-1.

(6) A route calculating unit 36 includes a link state database 36-1 that is "flooded" by the routing protocol, and a routing information database 36-2 that is calculated by using the link state database 36-1. The FIB is generated from the routing information.

(7) A path selection unit 38 includes an LSP information database 38-1 that contains information for each LSP, and a recovery path information database 38-2 that contains recovery path information that is added newly. The LIB is generated from the LSP information.

(8) A traffic engineering unit 37 realizes functions, such as load distribution and QoS/CoS.

According to the recovery mechanisms, such as restoration and protection, of the present invention, in link failure, node failure, etc., recovery from the failure is realized at high speed, and allocation of reserve bandwidth is optimized to the extent compatible with SONET/SDH level, and network performance is made efficient.

Further, the present invention is not limited to the embodiments specifically disclosed, but various modifications and implementations are conceivable without deviating from the scope of the claims of the present invention.

The invention claimed is:

1. A label switching router that carries out multiprotocol label switching (MPLS) on an internet protocol (IP) network, comprising said label switching router transmitting a failure message to another label switching router having an IP address indicating two or more stages upstream in a label switched path (LSP) on a working path, when a signal from a reception link in the LSP is no longer detected,
wherein a control LSP is set up, and the label switching router transmits the failure message to the another label switching router using the control LSP, and
wherein the failure message includes LSPs passing traffic on the working path to be switched to a recovery path, the LSPs being processed as a protection group.

2. A label switching router that carries out multiprotocol label switching (MPLS) on an internet protocol (IP) network, comprising a path switching label switching router (PSL) that switches from a working path to a recovery path, the PSL selecting another label switching router having an IP address indicating two or more stages downstream when the PSL receives a failure message via a control label switched path (LSP), the other label switching router serving as a path merging label switching router (PML) that receives signals from both the working path and the recovery path,
wherein the failure message includes LSPs passing traffic on the working path to be switched to the recovery path, the LSPs being processed as a protection group.

3. The label switching router as claimed in claim 2, wherein the control LSP is in a direction opposite to the working path that goes from the PSL to the PML.

4. The label switching router as claimed in claim 3, wherein messages transmitted on said control LSP, when switching is to be carried out, comprise a message type, an IP address of a transmitting label switching router, and information about a plurality of LSPs that are transmitting traffic on the working path that is to be switched.

5. The label switching router as claimed in claim 4, wherein said LSPs are grouped into a unit for switching from the working path to the recovery path, if said LSPs are passing traffic on the same working path from a specific PSL to a specific PML.

6. The label switching router as claimed in claim 5, wherein said unit of said LSPs is further divided into groups for every quality of service (QoS) and class of service (CoS) for switching from the working path to the recovery path, if the QoS and the CoS are set up in the working path.

7. The label switching router as claimed in claim 5, wherein the number of said LSPs and identifiers of said LSPs that are to be switched to the recovery path are provided from said PSL to said PML, and the recovery path is set up in a package by receiving a signal from said PML.

8. The label switching router as claimed in claim 7, wherein the recovery path for a section from said PSL to said PML prepared for said unit assigns a label only for the section using label stacking for forwarding.

9. The label switching router as claimed in claim 5, wherein a label processing unit stores information concerning said working path and said recovery path for said PSL to switch traffic to the recovery path, and switching back to the working path.

10. The label switching router as claimed in claim 5, wherein the label processing unit stores an entry of each of the working path and the recovery path, such that the label for the recovery path of a frame on the recovery path, received by the PML, is removed, and mapping to the working path can be performed.

11. A restoration and protection method for carrying out label switching in a label switching network having a plurality of label switching routers, comprising a step wherein one or more of said label switching routers transmits a failure message to another label switching router having an internet protocol (IP) address indicating two or more stages upstream in a label switched path (LSP) on a working path, when a signal from a reception link in the LSP is no longer detected,
wherein a control LSP is set up, and the one or more label switching router transmits the failure message to the another label switching router using the control LSP, and
wherein the failure message includes LSPs passing traffic on the working path to be switched to a recovery path, the LSPs being processed as a protection group.

12. A restoration and protection method that realizes multiprotocol label switching (MPLS) on an internet protocol (IP) network, comprising a step wherein a path switching label switching router (PSL) switches from a working path to a recovery path selecting another label switching router having an IP address indicating two or more stages downstream when the PSL receives a failure message via a control label switched path (LSP), said other label switching router serving as a path merging label switching router (PML) that receives signals from both the working path and the recovery path,
wherein the failure message includes LSPs passing traffic on the working path to be switched to the recovery path, the LSPs being processed as a protection group.

13. The restoration and protection method as claimed in claim 12, further comprising a step wherein the control LSP is in a direction opposite to the working path that goes from the PSL to the PML.

14. The restoration and protection method as claimed in claim 13, further comprising a step wherein messages transmitted on said control LSP, when switching is to be carried out, comprise a message type, an IP address of a transmitting label switching router, and information about a plurality of LSPs that are transmitting traffic on the working path that is to be switched.

15. The restoration and protection method as claimed in claim 14, further comprising a step wherein said LSPs are grouped into a unit for switching from the working path to the recovery path, if said LSPs are passing traffic on the same working path from a specific PSL to a specific PML.

16. The restoration and protection method as claimed in claim 15, further comprising a step wherein said unit of said LSPs is further divided into groups for every quality of service (QoS) and class of service (CoS) for switching from the working path to the recovery path, if the QoS and the CoS are set up in the working path.

17. The restoration and protection method as claimed in claim 15, further comprising a step wherein the number of said LSPs and identifiers of said LSPs that are to be switched to the recovery path are provided from said PSL to said PML, and the recovery path is set up in a package by receiving a signal from said PML.

18. The restoration and protection method as claimed in claim 17, further comprising a step wherein the recovery path for a section from said PSL to said PML prepared for said unit assigns a label only for the section using label stacking for forwarding.

19. The restoration and protection method as claimed in claim 15, further comprising a step wherein a label processing unit stores information concerning said working path and said recovery path such that said PSL is capable of switching traffic to the recovery path, and switching back to the working path.

20. The restoration and protection method as claimed in claim 15, further comprising a step wherein the label processing unit stores an entry of each of the working path and the recovery path, such that the label for the recovery path of a frame on the recovery path, received by said PML, is removed, and mapping to the working path can be performed.

21. A router that transmits a label corresponding to an addressed network, receives another label, sets up a label path by updating a routing table that contains the received label based on the received label, and transmits a packet only with reference to a label that corresponds to a low level header of an internet protocol (IP) packet header to the label path, comprising said router transmitting a failure notice to another router that is positioned two or more stages upstream on said label path on a working path, when packets are no longer received through said label path, wherein a control label switched path (LSP) is set up, and the router transmits the failure notice to the another router using the control LSP, and wherein the failure notice includes LSPs passing traffic on the working path to be switched to a recovery path, the LSPs being processed as a protection group.

* * * * *